(12) United States Patent
Wang et al.

(10) Patent No.: US 11,863,781 B2
(45) Date of Patent: Jan. 2, 2024

(54) SIGNALING OF PREDICTION WEIGHTS IN GENERAL CONSTRAINT INFORMATION OF A BITSTREAM

(71) Applicant: Bytedance Inc., Los Angeles, CA (US)

(72) Inventors: Ye-kui Wang, San Diego, CA (US); Li Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/891,603

(22) Filed: Aug. 19, 2022

(65) Prior Publication Data

US 2022/0400279 A1  Dec. 15, 2022

Related U.S. Application Data

(63) Continuation of application No. PCT/US2021/015017, filed on Jan. 26, 2021.

(60) Provisional application No. 62/978,740, filed on Feb. 19, 2020.

(51) Int. Cl.
| | |
|---|---|
| *H04N 19/46* | (2014.01) |
| *H04N 19/169* | (2014.01) |
| *H04N 19/174* | (2014.01) |
| *H04N 19/70* | (2014.01) |
| *H04N 19/105* | (2014.01) |
| *H04N 19/186* | (2014.01) |
| *H04N 19/172* | (2014.01) |

(52) U.S. Cl.
CPC ......... *H04N 19/46* (2014.11); *H04N 19/105* (2014.11); *H04N 19/172* (2014.11); *H04N 19/174* (2014.11); *H04N 19/186* (2014.11); *H04N 19/188* (2014.11); *H04N 19/70* (2014.11)

(58) Field of Classification Search
None
See application file for complete search history.

(56) References Cited

U.S. PATENT DOCUMENTS

| | | |
|---|---|---|
| 2004/0076237 A1 | 4/2004 | Kadono et al. |
| 2010/0215100 A1 | 8/2010 | Jeon et al. |
| 2013/0294500 A1 | 11/2013 | Wang |
| 2015/0098503 A1 | 4/2015 | Pu et al. |

(Continued)

FOREIGN PATENT DOCUMENTS

| | | |
|---|---|---|
| EP | 3588957 A1 | 5/2013 |
| WO | 2016138513 A1 | 9/2016 |
| WO | 2020251422 A2 | 12/2020 |

OTHER PUBLICATIONS

Philippe Bordes et al., "Improvement of Implicit Weighted Prediction" Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, JCTVC-I0115.*

(Continued)

*Primary Examiner* — Edemio Navas, Jr.
(74) *Attorney, Agent, or Firm* — Conley Rose, P.C.

(57) ABSTRACT

A method includes performing a conversion between a current slice of a current picture of a video and a bitstream of the video, wherein the bitstream conforms to a format rule, and wherein the format rule specifies that a general constraint information syntax structure, which comprises one or more constraint flags indicating constraints on an explicit weighted prediction being enabled for slices of a set of pictures, is present.

19 Claims, 10 Drawing Sheets

(56) References Cited

U.S. PATENT DOCUMENTS

| | | | |
|---|---|---|---|
| 2015/0195577 | A1 | 7/2015 | Hannuksela |
| 2016/0100189 | A1 | 4/2016 | Pang et al. |
| 2016/0255359 | A1 | 9/2016 | Yu et al. |
| 2017/0302951 | A1 | 10/2017 | Joshi et al. |
| 2018/0332298 | A1 | 11/2018 | Liu et al. |
| 2019/0116379 | A1 | 4/2019 | Sullivan et al. |
| 2019/0149839 | A1 | 5/2019 | Lu et al. |
| 2021/0136419 | A1 | 5/2021 | Hsiang |
| 2021/0185307 | A1 | 6/2021 | Chujoh et al. |
| 2021/0250581 | A1 | 8/2021 | Xu et al. |
| 2021/0258613 | A1 | 8/2021 | Hsu et al. |
| 2021/0392337 | A1 | 12/2021 | Lim et al. |
| 2022/0201336 | A1 | 6/2022 | Filippov et al. |
| 2022/0239937 | A1 | 7/2022 | Park et al. |
| 2022/0385934 | A1* | 12/2022 | Paluri .................. H04N 19/176 |
| 2022/0400260 | A1 | 12/2022 | Filippov et al. |
| 2023/0100733 | A1 | 3/2023 | Paluri |

OTHER PUBLICATIONS

"Information technology—High efficiency coding and media delivery in heterogeneous environments—Part 2: High Efficiency Video Coding", Rec. ITU-T H.265, ISO/IEC DIS 23008-2:201x (4th Ed.) ISO/IEC JTC 1/SC 29/WG 11 N176661, Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2001-VE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Document: JVET-Q2002-v3, Chen J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

VTM software, Retrieved from the Internet: https://vcgit.hhi.fraunhofer.de/jvet/VVCSoftware_VTM.git, Nov. 3, 2022, 3 pages.

Sjoberg, R., et al., "Overview of HEVC High-Level Syntax and Reference Picture Management," IEEE Transactions on Circuits and Systems for Video Technology, vol. 22, No. 12, Dec. 2012, 13 pages.

Foreign Communication From A related Counterpart Application, International Application No. PCT/US2021/015006, English Translation of International Search Report dated Apr. 20, 2021, 28 pages.

Foreign Communication From A related Counterpart Application, International Application No. PCT/US2021/015011, English Translation of International Search Report dated Apr. 9, 2021, 70 pages.

Foreign Communication From A related Counterpart Application, International Application No. PCT/US2021/015017, English Translation of International Search Report dated May 19, 2021, 12 pages.

Non-Final Office Action dated Jan. 4, 2023, 13 pages, U.S. Appl. No. 17/889,887, filed Aug. 17, 2022.

Non-Final Office Action dated Jan. 17, 2023, 17 pages, U.S. Appl. No. 17/891,590, filed Aug. 19, 2022.

Document: JVET-Q0247, Paluri, S., et al., "AHG9: Signalling the prediction weight table in the picture header," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JCTVC-I0115, Bordes, P., et al., "Improvement of Implicit Weighted Prediction," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, 10 pages.

Document: JVET-Q2001-v13, Bross, B., "Versatile Video Coding (Draft 8)," Joint Video Experts Team (JVET) of ITU-T SG 16 WP3 and ISO/IEC JTC 1/SC 29/WG 11, 17th Meeting:Brussels, BE, Jan. 7-17, 2020, total: 21 pages. pp. 43-45,58-61,110-117,147-148 & pp. 35-36,38-45,54-56,88.

Document: JVET-S0050-v3, Deng, Z., "AHG9: On general constraints information," Joint Video Experts Team (JVET) of ITU-T SG 16 WP 3 and ISO/IEC JTC 1/SC 29/WG 11, 19th Meeting: by teleconference, Jun. 22-Jul. 1, 2020, 9 pages.

Document: JVET-S0058, Naser, K., et al., "AHG9: Additional General Constraint Flags," Joint Video Experts Team (JVET) of ITU-T SG 16 WP 3 and ISO/IEC JTC 1/SC 29/WG 11, 19th Meeting: by teleconference, Jun. 22-Jul. 1, 2020, 4 pages.

Final Office Action dated May 25, 2023, 16 pages, U.S. Appl. No. 17/891,590, filed Aug. 19, 2022.

Foreign Communication From A Related Counterpart Application, European Application No. 21757437.5, Extended European Search Report dated Mar. 27, 2023, 9 pages.

* cited by examiner

600 →

> 610

Performing a conversion, according to a rule, between a current slice of a current picture of a video and a bitstream of the video, the rule specifying that a value of a first syntax element of a picture parameter set (PPS) and a value of a second syntax element of the PPS control whether a third syntax element is included in the bitstream, the first syntax element indicating whether a weighted prediction is enabled for bi-directional slices (B slices) of coded pictures in the bitstream referring to the PPS, the second syntax element indicating whether information related to the weighted prediction is present in picture headers or slice headers of coded pictures referring to the PPS, and the third syntax element indicating a number of weights associated with a reference picture list 1 of the current slice

SIGNALING OF PREDICTION WEIGHTS IN GENERAL CONSTRAINT INFORMATION OF A BITSTREAM

CROSS-REFERENCE TO RELATED APPLICATION

This application is a continuation of International Patent Application No. PCT/US2021/015017 filed on Jan. 26, 2021, which claims the priority to and benefits of U.S. Provisional Patent Application No. 62/978,740 filed on Feb. 19, 2020, all of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques, which include weighted prediction, that can be used by video encoders and decoders for processing a bitstream of a video to perform video encoding and decoding.

In one example aspect, a video processing method is disclosed. The method includes performing a conversion, according to a rule, between a current slice of a current picture of a video and a bitstream of the video, wherein the rule specifies that a value of a first syntax element of a picture parameter set (PPS) and a value of a second syntax element of the PPS control whether a third syntax element is included in the bitstream, and wherein the first syntax element indicates whether a weighted prediction is enabled for bi-directional slices (B slices) of coded pictures in the bitstream referring to the PPS, the second syntax element indicates whether information related to the weighted prediction is present in picture headers or slice headers of coded pictures referring to the PPS, and the third syntax element indicates a number of weights associated with a reference picture list 1 of the current slice.

In another example aspect, another video processing method is disclosed. The method includes performing a conversion between a current slice of a current picture of a video and a bitstream of the video, wherein the bitstream conforms to a format rule, and wherein the format rule specifies that values of a plurality of syntax elements indicative of whether prediction weights are included in a slice header of the current slice are inferred based on a slice type of the current slice and a value of a first flag included in a picture parameter set (PPS) referred to by the current picture.

In yet another example aspect, another video processing method is disclosed. The method includes performing a conversion between a current slice of a current picture of a video and a bitstream of the video, wherein the bitstream conforms to a format rule, and wherein the format rule specifies that a general constraint information syntax structure, which comprises one or more constraint flags indicating constraints on an explicit weighted prediction being enabled for slices of a set of pictures, is present.

In yet another example aspect, another video processing method is disclosed. The method includes performing a conversion, according to a rule, between a current slice of a current picture of a video and a bitstream of the video, wherein the rule specifies that one or more constraint flags indicating constraints on an explicit weighted prediction being enabled for slices of a set of pictures is included in a parameter set or a header associated with the current slice.

In yet another example aspect, another video processing method is disclosed. The method includes performing a conversion between a video comprising a current picture and a bitstream of the video, wherein the bitstream conforms to a format rule, and wherein the format rule specifies that an indication of whether the current picture excludes a bi-directional slice (B slice) is included in a picture header syntax structure associated with the current picture.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a computer readable medium having code stored thereon is disclosed. The code embodies one of the methods described herein in the form of processor-executable code.

These, and other, features are described throughout the present document.

BRIEF DESCRIPTION OF DRAWINGS

FIGS. 6-10 show flowcharts for example methods of video processing.

DETAILED DESCRIPTION

Figure 1:
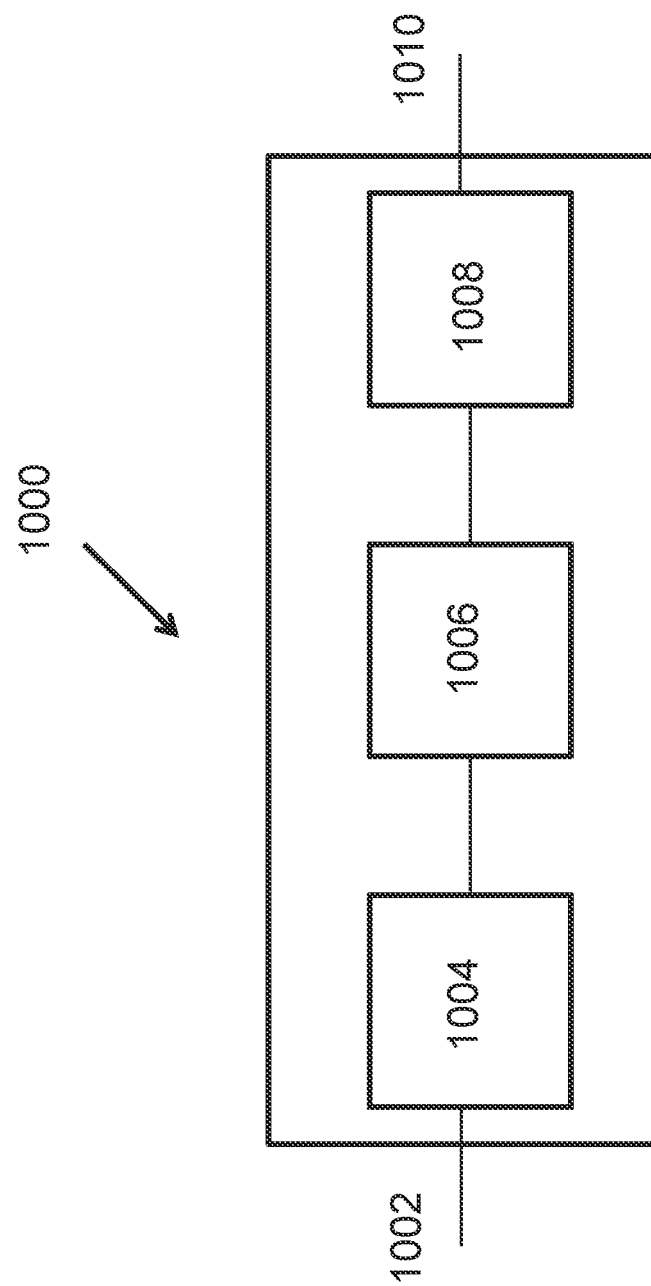
FIG. 1 is a block diagram showing an example video processing system in which various embodiments of the present disclosure may be implemented.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Summary

This document is related to video coding technologies. Specifically, it is about the design of picture header (PH) and slice header (SH) syntax in video coding. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RBSP Raw Byte Sequence Payload
SEI Supplemental Enhancement Information
SH Slice Header
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The VET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. PH Syntax and Semantics

In the latest VVC draft text, the PH syntax and semantics are as follows:

|  | Descriptor |
|---|---|
| picture_header_rbsp( ) { |  |
|   picture_header_structure( ) |  |
|   rbsp_trailing_bits( ) |  |
| } |  |

The PH RBSP contains a PH syntax structure, i.e., picture_header_structure( ).

|  | Descriptor |
|---|---|
| picture_header_structure( ) { |  |
|   gdr_or_irap_pic_flag | u(1) |
|   if( gdr_or_irap_pic_flag ) |  |
|     gdr_pic_flag | u(1) |
|   ph_inter_slice_allowed_flag | u(1) |
|   if( ph_inter_slice_allowed_flag ) |  |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) |  |
|     no_output_of_prior_pics_flag | u(1) |
|   if( gdr_pic_flag ) |  |
|     recovery_poc_cnt | ue(v) |
|   for( i = 0; i < NumExtraPhBits; i++ ) |  |
|     ph_extra_bit[ i ] | u(1) |
|   if( sps_poc_msb_flag ) { |  |
|     ph_poc_msb_present_flag | u(1) |
|     if( ph_poc_msb_present_flag ) |  |
|       poc_msb_val | u(v) |
|   } |  |
|   if( sps_alf_enabled_flag |  |
|   && alf_info_in_ph_flag ) { |  |
|     ph_alf_enabled_flag | u(1) |
|     if( ph_alf_enabled_flag ) { |  |
|       ph_nom_alf_aps_ids_luma | u(3) |
|       for( i = 0; i < ph_num_alf_aps_ids_luma; i++ ) |  |
|         ph_alf_aps_id_luma[ i ] | u(3) |
|       if( ChromaArrayType != 0 ) |  |
|         ph_alf_chroma_idc | u(2) |
|       if( ph_alf_chroma_idc > 0 ) |  |
|         ph_alf_aps_id_chroma | u(3) |
|       if( sps_ccalf_enabled_flag ) { |  |
|         ph_cc_alf_cb_enabled_flag | u(1) |
|         if( ph_cc_alf_cb_enabled_flag ) |  |
|           ph_cc_alf_cb_aps_id | u(3) |
|         ph_cc_alf_cr_enabled_flag | u(1) |
|         if( ph_cc_alf_cr_enabled_flag ) |  |
|           ph_cc_alf_cr_aps_id | u(3) |
|       } |  |
|     } |  |
|   } |  |
|   if( sps_lmcs_enabled_flag ) { |  |
|     ph_lmcs_enabled_flag | u(1) |
|     if( ph_lmcs_enabled_flag ) { |  |
|       ph_lmcs_aps_id | u(2) |
|       if( ChromaArrayType != 0 ) |  |
|         ph_chroma_residual_scale_flag | u(1) |
|     } |  |
|   } |  |

|  | Descriptor |
|---|---|
| `if( sps_scaling_list_`<br>`  enabled_flag ) {` | |
| `  ph_scaling_list_present_flag` | u(1) |
| `  if( ph_scaling_`<br>`  list_present_flag )` | |
| `    ph_scaling_list_aps_id` | u(3) |
| `}` | |
| `if( sps_virtual_boundaries_`<br>`enabled_flag && !sps_`<br>`virtual_boundaries_`<br>`present_flag ) {` | |
| `  ph_virtual_boundaries_`<br>`  present_flag` | u(1) |
| `  if( ph_virtual_`<br>`  boundaries_present_flag ) {` | |
| `    ph_num_ver_`<br>`    virtual_boundaries` | u(2) |
| `    for( i = 0; i < ph_num_`<br>`    ver_virtual_boundaries; i++ )` | |
| `      ph_virtual_`<br>`      boundaries_pos_x[ i ]` | u(13) |
| `    ph_num_hor_virtual_boundaries` | u(2) |
| `    for( i = 0; i < ph_num_`<br>`    hor_virtual_boundaries; i++ )` | |
| `      ph_virtual_`<br>`      boundaries_pos_y[ i ]` | u(13) |
| `  }` | |
| `}` | |
| `if( output_flag_present_flag )` | |
| `  pic_output_flag` | u(1) |
| `if( rpl_info_in_ph_flag )` | |
| `  ref_pic_lists( )` | |
| `if( partition_constraints_`<br>`override_enabled_flag )` | |
| `  partition_constraints_`<br>`  override_flag` | u(1) |
| `if( ph_intra_slice_allowed_flag ) {` | |
| `  if( partition_constraints_`<br>`  override_flag ) {` | |
| `    ph_log2_diff_min_qt_`<br>`    min_cb_intra_slice_luma` | ue(v) |
| `    ph_max_mtt_hierarchy_`<br>`    depth_intra_slice_luma` | ue(v) |
| `    if( ph_max_mtt_hierarchy_`<br>`    depth_intra_slice_luma != 0 ) {` | |
| `      ph_log2_diff_max_bt_`<br>`      min_qt_intra_slice_luma` | ue(v) |
| `      ph_log2_diff_max_tt_`<br>`      min_qt_intra_slice_luma` | ue(v) |
| `    }` | |
| `    if( qtbtt_dual_tree_intra_flag ) {` | |
| `      ph_log2_diff_min_qt_min_`<br>`      cb_intra_slice_chroma` | ue(v) |
| `      ph_max_mtt_hierarchy_`<br>`      depth_intra_slice_chroma` | ue(v) |
| `      if( ph_max_mtt_hierarchy_`<br>`      depth_intra_slice_`<br>`      chroma != 0 ) {` | |
| `        ph_log2_diff_max_bt_`<br>`        min_qt_intra_slice_chroma` | ue(v) |
| `        ph_log2_diff_max_tt_`<br>`        min_qt_intra_slice_chroma` | ue(v) |
| `      }` | |
| `    }` | |
| `  }` | |
| `  if( cu_qp_delta_enabled_flag )` | |
| `    ph_cu_qp_delta_`<br>`    subdiv_intra_slice` | ue(v) |
| `  if( pps_cu_chroma_qp_`<br>`  offset_list_enabled_flag )` | |
| `    ph_cu_chroma_qp_`<br>`    offset_subdiv_intra_slice` | ue(v) |
| `}` | |
| `if( ph_inter_slice_allowed_flag ) {` | |
| `  if( partition_constraints_`<br>`  override_flag ) {` | |
| `    ph_log2_diff_min_`<br>`    qt_min_cb_inter_slice` | ue(v) |
| `    ph_max_mtt_hierarchy_`<br>`    depth_inter_slice` | ue(v) |
| `    if( ph_max_mtt_hierarchy_`<br>`    depth_inter_slice != 0 ) {` | |
| `      ph_log2_diff_max_`<br>`      bt_min_qt_inter_slice` | ue(v) |
| `      ph_log2_diff_max_`<br>`      tt_min_qt_inter_slice` | ue(v) |
| `    }` | |
| `  }` | |
| `  if( cu_qp_delta_enabled_flag )` | |
| `    ph_cu_qp_delta_`<br>`    subdiv_inter_slice` | ue(v) |
| `  if( pps_cu_chroma_qp_`<br>`  offset_list_enabled_flag )` | |
| `    ph_cu_chroma_qp_`<br>`    offset_subdiv_inter_slice` | ue(v) |
| `  if( sps_temporal_`<br>`  mvp_enabled_flag ) {` | |
| `    ph_temporal_mvp_enabled_flag` | u(1) |
| `    if( ph_temporal_`<br>`    mvp_enabled_flag &&`<br>`    rpl_info_in_ph_flag ) {` | |
| `      ph_collocated_from_l0_flag` | u(1) |
| `      if( ( ph_collocated_`<br>`      from_l0_flag &&`<br>`        num_ref_entries[ 0 ]`<br>`        [ RplsIdx[ 0 ] ] > 1 ) \|\|`<br>`        ( !ph_collocated_`<br>`        from_l0_flag &&`<br>`        num_ref_entries[ 1 ]`<br>`        [ RplsIdx[ 1 ] ] > 1 ) )` | |
| `        ph_collocated_ref_idx` | ue(v) |
| `    }` | |
| `  }` | |
| `  mvd_l1_zero_flag` | u(1) |
| `  if( sps_fpel_mmvd_`<br>`  enabled_flag )` | |
| `    ph_fpel_mmvd_enabled_flag` | u(1) |
| `  if( sps_bdof_pic_present_flag )` | |
| `    ph_disable_bdof_flag` | u(1) |
| `  if( sps_dmvr_pic_present_flag )` | |
| `    ph_disable_dmvr_flag` | u(1) |
| `  if( sps_prof_pic_present_flag )` | |
| `    ph_disable_prof_flag` | u(1) |
| `  if( ( pps_weighted_pred_flag \|\|`<br>`  pps_weighted_bipred_flag )`<br>`  && wp_info_in_ph_flag )` | |
| `    pred_weight_table( )` | |
| `}` | |
| `if( qp_delta_info_in_ph_flag )` | |
| `  ph_qp_delta` | se(v) |
| `if( sps_joint_cbcr_enabled_flag )` | |
| `  ph_joint_cbcr_sign_flag` | u(1) |
| `if( sps_sao_enabled_flag`<br>`&& sao_info_in_ph_flag ) {` | |
| `  ph_sao_luma_enabled_flag` | u(1) |
| `  if( ChromaArrayType != 0 )` | |
| `    ph_sao_chroma_enabled_flag` | u(1) |
| `}` | |
| `if( sps_dep_quant_enabled_flag )` | |
| `  ph_dep_quant_enabled_flag` | u(1) |
| `if( sps_sign_data_hiding_`<br>`enabled_flag &&`<br>`!ph_dep_quant_enabled_flag )` | |
| `  pic_sign_data_`<br>`  hiding_enabled_flag` | u(1) |
| `if( deblocking_filter_`<br>`override_enabled_flag &&`<br>`dbf_info_in_ph_flag ) {` | |
| `  ph_deblocking_`<br>`  filter_override_flag` | u(1) |
| `  if( ph_deblocking_` | |

| | Descriptor |
|---|---|
| ``filter_override_flag ) {`` | |
| ``  ph_deblocking_`` | u(1) |
| ``  filter_disabled_flag`` | |
| ``  if( !ph_deblocking_`` | |
| ``  filter_disabled_flag ) {`` | |
| ``    ph_beta_offset_div2`` | se(v) |
| ``    ph_tc_offset_div2`` | se(v) |
| ``    ph_cb_beta_offset_div2`` | se(v) |
| ``    ph_cb_tc_offset_div2`` | se(v) |
| ``    ph_cr_beta_offset_div2`` | se(v) |
| ``    ph_cr_tc_offset_div2`` | se(v) |
| ``  }`` | |
| `` }`` | |
| ``}`` | |
| ``if( picture_header_`` | |
| ``extension_present_flag ) {`` | |
| ``  ph_extension_length`` | ue(v) |
| ``  for( i = 0; i <`` | |
| ``  ph_extension_length; i++)`` | |
| ``    ph_extension_data_byte[ i ]`` | u(8) |
| `` }`` | |
| ``}`` | |

The PH syntax structure contains information that is common for all slices of the coded picture associated with the PH syntax structure.

gdr_or_irap_pic_flag equal to 1 specifies that the current picture is a GDR or Intra Random Access Point (IRAP) picture. gdr_or_irap_pic_flag equal to 0 specifies that the current picture may or may not be a GDR or IRAP picture. gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag may be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

NOTE 1—For bitstreams that are supposed to work subpicture based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id may be in the range of 0 to 63, inclusive. For bitstream conformance, the value of TemporalId of the PH may be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log2_max_pic_order_cnt_lsb_minus4+4 bits. The value of the ph_pic_order_cnt_lsb may be in the range of 0 to MaxPicOrderCntLsb−1, inclusive.

no_output_of_prior_pics_flag affects the output of previously-decoded pictures in the DPB after the decoding of a coded layer video sequence start (CLVSS) picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture may not precede the current GDR picture in decoding order. The value of recovery_poc_cnt may be in the range of 0 to MaxPicOrderCntLsb−1, inclusive.

When the current picture is a GDR picture, the variable RpPicOrderCntVal is derived as follows:

$$RpPicOrderCntVal = PicOrderCntVal + recovery\_poc\_cnt \quad (82)$$

NOTE 2—When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification may ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag may be equal to 0.

poc_msb_val specifies the picture order count (POC) most significant bit (MSB) value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of adaptive loop filter (ALF) APSs that the slices associated with the PH refers to.

ph_alf_aps_id_luma[i] specifies the adaptation_parameter_set_id of the i-th ALF APS that the luma component of the slices associated with the PH refers to.

The value of alf_luma_filter signal_flag of the APS network abstraction layer (NAL) unit having aps_params_type equal to ALF_APS and adaptation_parameter_set_id equal to ph_alf_aps_id_luma[i] may be equal to 1.

The TemporalId of the APS NAL unit having aps_params_type equal to ALF_APS and adaptation_parameter_set_id equal to ph_alf_aps_id_luma[i] may be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma may be equal to 1. The TemporalId of the APS NAL unit having aps_params_type equal to ALF_APS and adaptation_parameter_set_id equal to ph_alf_aps_id_chroma may be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id may be equal to 1.

The TemporalId of the APS NAL unit having aps_params_type equal to ALF_APS and adaptation_parameter_set_id equal to ph_cc_alf_cb_aps_id may be less than or equal to the TemporalId of the picture associated with the PH.

ph_cc_alf_cr_enabled_flag equal to 1 specifies that cross-component filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal_flag of the APS NAL unit having aps_params_type equal to ALF_APS and adaptation_parameter_set_id equal to ph_cc_alf_cr aps_id may be equal to 1.

The TemporalId of the APS NAL unit having aps_params_type equal to ALF_APS and adaptation_parameter_set_id equal to ph_cc_alf_cr_aps_id may be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id may be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set id equal to ph_scaling_list_aps_id may be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

For bitstream conformance, when subpic_info_present_flag is equal to 1, the value of ph_virtual_boundaries_present_flag may be equal to 0.

The variable VirtualBoundariesPresentFlag is derived as follows:

```
VirtualBoundariesPresentFlag                    =                    0
if(                       sps_virtual_boundaries_enabled_flag                       )
  VirtualBoundariesPresentFlag   =   sps_virtual_boundaries_present_flag    | |
      ph_virtual _boundaries_present_flag
  (83)
``` ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable NumVerVirtualBoundaries is derived as follows:

```
NumVerVirtualBoundaries                                      = 0
if(                  sps_virtual_boundaries_enabled_flag       )
   NumVerVirtualBoundaries  =  sps_virtual_boundaries_present_flag  ?
      sps_num_ver_virtual_boundaries : ph_num_ver_virtual_boundaries   (84)
``` ph_virtual_boundaries_pos_x[i] specifies the location of the i-th vertical virtual boundary in units of luma samples divided by 8. The value of ph_virtual_boundaries_pos_x[i] may be in the range of 1 to Ceil(pic_width_in_luma_samples÷8)−1, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

```
for(      i    =    0;    i   <   NumVerVirtualBoundaries;        i++)
   VirtualBoundariesPosX[ i ]  =  (     sps_virtual_boundaries_present_flag   ?
      sps_virtual_boundaries_pos_x[ i ] : ph_virtual_boundaries_pos_x[ i ] ) * 8   (85)
```

The distance between any two vertical virtual boundaries may be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

```
NumHorVirtualBoundaries                                      = 0
if(                sps_virtual_boundaries_enabled_flag         )
NumHorVirtualBoundaries  =  sps_virtual_boundaries _present_flag   ?
sps_num_hor_virtual_boundaries: ph_num_hor_virtual_boundaries   (86)
```

When sps_virtual_boundaries_enabled_flag is equal to 1 and ph_virtual_boundaries_present_flag is equal to 1, the sum of ph_num_ver_virtual_boundaries and ph_num_hor_virtual_boundaries may be greater than 0.

ph_virtual_boundaries_pos_y[i] specifies the location of the i-th horizontal virtual boundary in units of luma samples divided by 8. The value of ph_virtual_boundaries_pos_y[i] may be in the range of 1 to Ceil(pic_height_in_luma_samples÷8)−1, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

```
for(     i    =    0;    i    <    NumHorVirtualBoundaries;        i++)
   VirtualBoundariesPosY[ i ]   =    ( sps_virtual_boundaries_present_flag    ?
      sps_virtual_boundaries_pos_y[ i ] : ph_virtual_boundaries_pos_y[ i ] ) * 8   (87)
```

The distance between any two horizontal virtual boundaries may be greater than or equal to CtbSizeY luma samples.

pic_output_flag affects the decoded picture output and removal processes as specified in Annex C. When pic_output_flag is not present, it is inferred to be equal to 1.

partition_constraints_override_flag equal to 1 specifies that partition constraint parameters are present in the PH. The partition_constraints_override_flag equal to 0 specifies that partition constraint parameters are not present in the PH.

When not present, the value of partition_constraints_override_flag is inferred to be equal to 0.

ph_log2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log2_diff_min_qt_min_cb_intra_slice_luma may be in the range of 0 to CtbLog2SizeY−MinCbLog2SizeY, inclusive. When not present, the value of ph_log2_diff_min_qt_min_cb_luma is inferred to be equal to sps_log2_diff_mi n_qt_min_cb_intra_slice_luma.

ph_max_mtt_hierarchy_depth_intra_slice luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma may be in the range of 0 to 2*(CtbLog2SizeY−MinCbLog2SizeY), inclusive. When not present, the value of ph_max_mtt_hierarchy_depth_intra_slice_luma is inferred to be equal to sps_max_mtt_hierarchy_depth_intra_slice_luma.

ph_log2_diff_max_bt_min qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log2_diff_max_bt_min_qt_intra_slice_luma may be in the range of 0 to CtbLog2SizeY−MinQtLog2SizeIntraY, inclusive. When not present, the value of ph_log2_diff_max_bt_min_qt_intra_slice_luma is inferred to be equal to sps_log2_diff_max_bt_min_qt_intra_slice_luma.

ph_log2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log2_diff_max_t_min_qt_intra_slice_luma may be in the range of 0 to CtbLog2SizeY−MinQtLog2SizeIntraY, inclusive. When not present, the value of ph_log2_diff_max_tt_min_qt_intra_slice_luma is inferred to be equal to sps_log2_diff_max_tt_min_qt_intra_slice_luma.

ph_log2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log2_diff_min_qt_min_cb_intra_slice_chroma may be in the range of 0 to CtbLog2SizeY−MinCbLog2SizeY, inclusive. When not present, the value of ph_log2_diff_min_qt_min_cb_intra_slice_chroma is inferred to be equal to sps_log2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma may be in the range of 0 to 2*(CtbLog2SizeY−MinCbLog2SizeY), inclusive. When not present, the value of ph_max_mtt_hierarchy_depth_intra_slice_chroma is inferred to be equal to sps_max_mtt_hierarchy_depth_intra_slice_chroma.

ph_log2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2(I) associated with the PH. The value of ph_log2_diff_max_bt_min_qt_intra_slice_chroma may be in the range of 0 to CtbLog2SizeY−MinQtLog2SizeIntraC, inclusive. When not present, the value of ph_log2_diff_max_bt_min_qt_intra_slice_chroma is inferred to be equal to sps_log2_diff_max_bt_min_qt_intra_slice_chroma.

ph_log2_diff_max_tt_min_qt intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2(I) associated with the PH. The value of ph_log2_diff_max_tt_min_qt_intra_slice_chroma may be in the range of 0 to CtbLog2SizeY−MinQtLog2SizeIntraC, inclusive. When not present, the value of ph_log2_diff_max_tt_min_qt_intra_slice_chroma is inferred to be equal to sps_log2_diff_max_tt_min_qt_intra_slice_chroma.

ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice may be in the range of 0 to 2*(CtbLog2SizeY−MinQtLog2SizeIntraY+ph_max_mtt_hierarchy_depth_intra_slice_luma), inclusive.

When not present, the value of ph_cu_qp_delta_subdiv_intra_slice is inferred to be equal to 0. ph_cu_chroma qp_offset_subdiv_intra_slice specifies the maximum cbSubdiv value of coding units in intra slice that convey cu_chroma_qp_offset_flag. The value of ph_cu_chroma_qp_offset_subdiv_intra_slice may be in the range of 0 to 2*(CtbLog2SizeY−MinQtLog2SizeintraY+ ph_max_mtt_hierarchy_depth_intra_slice_luma), inclusive.

When not present, the value of ph_cu_chroma_qp_offset_subdiv_intra_slice is inferred to be equal to 0.

ph_log2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log2_diff_min_qt_min_cb_inter_slice may be in the range of 0 to CtbLog2SizeY−MinCbLog2SizeY, inclusive. When not present, the value of ph_log2_diff_min_qt_min_cb_luma is inferred to be equal to sps_log2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice may be in the range of 0 to 2*(CtbLog2SizeY−MinCbLog2SizeY), inclusive. When not present, the value of ph_max_mtt_hierarchy_depth_inter_slice is inferred to be equal to sps_max_mtt_hierarchy_depth_inter_slice.

ph_log2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log2_diff_max_bt_min_qt_inter_slice may be in the range of 0 to CtbLog2SizeY−MinQtLog2SizeInterY, inclusive. When not present, the value of ph_log2_diff_max_bt_min_qt_inter_slice is inferred to be equal to sps_log2_diff_max_bt_min_qt_inter_slice.

ph_log2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log2_diff_max tt_min_qt_inter_slice may be in the range of 0 to CtbLog2SizeY−MinQtLog2SizeInterY, inclusive. When not present, the value of ph_log2_diff_max_tt_min_qt_inter_slice is inferred to be equal to sps_log2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice may be in the range of 0 to 2*(CtbLog2SizeY−MinQtLog2SizeInterY+ph_max_mtt_hierarchy_depth_inter_slice), inclusive.

When not present, the value of ph_cu_qp_delta_subdiv_inter_slice is inferred to be equal to 0. ph_cu_chroma qp_offset_subdiv_inter_slice specifies the maximum cbSubdiv value of coding units in inter slice that convey cu_chroma_qp_offset_flag. The value of ph_cu_chroma_qp_offset_subdiv_inter_slice may be in the range of 0 to 2*(CtbLog2SizeY−MinQtLog2SizeInterY+ph_max_mtt_hierarchy_depth_inter_slice), inclusive.
When not present, the value of ph_cu_chroma_qp_offset_subdiv_inter_slice is inferred to be equal to 0.
ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH may be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag may be equal to 0.
The maximum number of subblock-based merging motion vector prediction (MVP) candidates, MaxNumSubblockMergeCand, is derived as follows:

```
if(                    sps_affine_enabled_flag                    )
   MaxNumSubblockMergeCand = 5 − five_minus_max_num_subblock_merge_cand
   (88)
else
   MaxNumSubblockMergeCand                                        =
sps_sbtmvp_enabled_flag && ph_temporal_mvp_enable_flag
```

The value of MaxNumSubblockMergeCand may be in the range of 0 to 5, inclusive.
ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.
ph_collocated_ref_idx specifies the reference index of the collocated picture used for temporal motion vector prediction.
When ph_collocated_from_l0_flag is equal to 1, ph_collocated_ref_idx refers to an entry in reference picture list 0, and the value of ph_collocated_ref_idx may be in the range of 0 to num_ref_entries[0][RplsIdx[0]]−1, inclusive.
When ph_collocated_from_l0_flag is equal to 0, ph_collocated_ref_idx refers to an entry in reference picture list 1, and the value of ph_collocated_ref_idx may be in the range of 0 to num_ref_entries[1][RplsIdx[1]]−1, inclusive.
When not present, the value of ph_collocated_ref_idx is inferred to be equal to 0.
mvd_l1_zero_flag equal to 1 indicates that the mvd_coding (x0, y0, 1) syntax structure is not parsed and MvdL1[x0][y0][compIdx] and MvdCpL1[x0][y0][cpIdx][compIdx] are set equal to 0 for compIdx=0 . . . 1 and cpIdx=0 . . . 2. mvd_l1_zero_flag equal to 0 indicates that the mvd_coding (x0, y0, 1) syntax structure is parsed.
ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.
When ph_disable_bdof_flag is not present, the following applies:
   If sps_bdof_enabled_flag is equal to 1, the value of ph_disable_bdof_flag is inferred to be equal to 0.
   Otherwise (sps_bdof_enabled_flag is equal to 0), the value of ph_disable_bdof_flag is inferred to be equal to 1.
ph_disable_dmvr_flag equal to 1 specifies that decoder motion vector refinement based inter bi-prediction is disabled in the slices associated with the PH. ph_disable_dmvr_flag equal to 0 specifies that decoder motion vector refinement based inter bi-prediction may or may not be enabled in the slices associated with the PH.
When ph_disable_dmvr_flag is not present, the following applies:
   If sps_dmvr_enabled_flag is equal to 1, the value of ph_disable_dmvr_flag is inferred to be equal to 0.
   Otherwise (sps_dmvr_enabled_flag is equal to 0), the value of ph_disable_dmvr_flag is inferred to be equal to 1.
ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH. When ph_disable_prof_flag is not present, the following applies:
   If sps_affine_prof_enabled_flag is equal to 1, the value of ph_disable_prof_flag is inferred to be equal to 0.
   Otherwise (sps_affine_prof_enabled_flag is equal to 0), the value of ph_disable_prof_flag is inferred to be equal to 1.
ph_qp_delta specifies the initial value of $Qp_Y$ to be used for the coding blocks in the picture until modified by the value of CuQpDeltaVal in the coding unit layer.
When qp_delta_info_in_ph_flag is equal to 1, the initial value of the $Qp_Y$ quantization parameter for all slices of the picture, SliceQpv, is derived as follows:

$$SliceQp_Y = 26 + init\_qp\_minus26 + ph\_qp\_delta \quad (89)$$

The value of $SliceQp_Y$ may be in the range of −QpBdOffset to +63, inclusive.
ph_joint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that the sample adaptive offset (SAO) is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 may both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for β and tC (divided by 2) that are applied to the Cb component for the slices associated with the PH. The values of ph_cb_beta_offset_div2 and ph_cb_tc_offset_div2 may both be in the range of −12 to 12, inclusive. When not present, the values of ph_cb_betaa_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 may both be in the range of −12 to 12, inclusive. When not present, the values of ph_cr_beta_offset_div2 and ph_cr_tc_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length may be in the range of 0 to 256, inclusive. When not present, the value of ph_extension_length is inferred to be equal to 0.

ph_extension_data_byte may have any value. Decoders conforming to this version of this Specification may ignore the value of ph_extension_data_byte. Its value does not affect decoder conformance to profiles specified in this version of specification.

3.2. SH Syntax and Semantics

In the latest VVC draft text, the SH syntax and semantics are as follows:

| | Descriptor |
|---|---|
| slice_header( ) { | |
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && | |
|   NumSlicesInSubpic | |
|   [ CurrSubpicIdx ] > 1 ) \|\| | |
|     ( !rect_slice_flag && | |
|     NumTilesInPic > 1 ) ) | |
|     slice_address | u(v) |
|   for( i = 0; i < | |
|   NumExtraShBits; i++ ) | |
|     sh_extra_bit[ i ] | u(1) |
|   if( !rect_slice_flag && | |
|   NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag | |
|   && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( ( nal_unit_type != IDR_W_RADL && nal_unit_type != IDR_N_LP ) \|\| sps_idr_rpl_present_flag ) ) | |
|     ref_pic_lists( ) | |

| | Descriptor |
|---|---|
| `if( ( rpl_info_in_ph_flag | |` <br> `( ( nal_unit_type !=` <br> `IDR_W_RADL &&` <br> `nal_unit_type !=` <br> `    IDR_N_LP ) | | sps_idr_` <br> `    rpl_present_flag ) ) &&` <br> `( slice_type != I &&` <br> `num_ref_entries[ 0 ]` <br> `[ RplsIdx[ 0 ] ] > 1 ) | |` <br> `( slice_type = = B &&` <br> `num_ref_entries[ 1 ][ RplsIdx` <br> `[ 1 ] ] > 1 ) ) {` <br> `  num_ref_idx_` <br> `  active_override_flag` | u(1) |
| `  if( num_ref_idx_` <br> `  active_override_flag )` <br> `    for( i = 0; i < ( slice_type = =` <br> `    B ? 2 : 1 ); i++ )` <br> `      if( num_ref_entries` <br> `      [ i ][ RplsIdx[ i ] ] > 1 )` <br> `        num_ref_idx_` <br> `        active_minus1[ i ]` | ue(v) |
| `}` <br> `if( slice_type != I ) {` <br> ` if( cabac_init_` <br> ` present_flag )` <br> `  cabac_init_flag` | u(1) |
| ` if( ph_temporal_mvp_` <br> ` enabled_flag &&` <br> ` !rpl_info_in_ph_flag ) {` <br> `   if( slice_type = = B )` <br> `     slice_collocated_from_l0_flag` | u(1) |
| `   if( ( slice_collocated_` <br> `   from_l0_flag &&` <br> `   NumRefIdxActive[ 0 ] > 1 ) | |` <br> `     ( ! slice_collocated_from_` <br> `l0_flag &&` <br> `NumRefIdxActive[ 1 ] > 1 ) )` <br> `     slice_collocated_ref_idx` | ue(v) |
| ` }` <br> ` if( !wp_info_in_ph_flag` <br> `&& ( ( pps_weighted_pred_flag` <br> `&& slice_type` <br> `= = P ) | |` <br> `  ( pps_weighted_bipred_` <br> `  flag && slice_type = = B ) ) )` <br> `  pred_weight_table( )` <br> `}` <br> `if( !qp_delta_info_in_ph_flag )` <br> ` slice_qp_delta` | se(v) |
| `if( pps_slice_chroma_` <br> `qp_offsets_present_flag ) {` <br> `  slice_cb_qp_offset` | se(v) |
| `  slice_cr_qp_offset` | se(v) |
| `  if( sps_joint_cbcr_enabled_flag )` <br> `    slice_joint_cbcr_qp_offset` | se(v) |
| `}` <br> `if( pps_cu_chroma_qp_` <br> `offset_list_enabled_flag )` <br> `  cu_chroma_qp_` <br> `  offset_enabled_flag` | u(1) |
| `if( sps_sao_enabled_flag` <br> `&& !sao_info_in_ph_flag ) {` <br> `  slice_sao_luma_flag` | u(1) |
| `  if( ChromaArrayType != 0 )` <br> `    slice_sao_chroma_flag` | u(1) |
| `}` <br> `if( deblocking_filter_` <br> `override_enabled_flag &&` <br> `!dbf_info_in_ph_flag )` <br> `  slice_deblocking_` <br> `  filter_override_flag` | u(1) |
| `if( slice_deblocking_` <br> `filter_override_flag ) {` <br> `  slice_deblocking_` <br> `  filter_disabled_flag` | u(1) |
| `  if( !slice_deblocking_` <br> `  filter_disabled_flag ) {` <br> `    slice_beta_offset_div2` | se(v) |
| `    slice_tc_offset_div2` | se(v) |
| `    slice_cb_beta_offset_div2` | se(v) |
| `    slice_cb_tc_offset_div2` | se(v) |
| `    slice_cr_beta_offset_div2` | se(v) |
| `    slice_cr_tc_offset_div2` | se(v) |
| `  }` <br> `}` <br> `slice_ts_residual_` <br> `coding_disabled_flag` | u(1) |
| `if( ph_lmcs_enabled_flag )` <br> `  slice_lmcs_enabled_flag` | u(1) |
| `if( ph_scaling_list_` <br> `enabled_flag )` <br> `  slice_scaling_list_present_flag` | u(1) |
| `if( NumEntryPoints > 0 ) {` <br> `  offset_len_minus1` | ue(v) |
| `  for( i = 0; i <` <br> `  NumEntryPoints; i++ )` <br> `    entry_point_offset_minus1[ i ]` | u(v) |
| `}` <br> `if( slice_header_` <br> `extension_present_flag ) {` <br> `  slice_header_extension_length` | ue(v) |
| `  for( i = 0; i < slice_` <br> `  header_extension_length; i++)` <br> `    slice_header_` <br> `    extension_data_byte[ i ]` | u(8) |
| `}` <br> `byte_alignment( )` <br> `}` | |

The variable CuQpDeltaVal, specifying the difference between a luma quantization parameter for the coding unit containing cu_qp_delta_abs and its prediction, is set equal to 0. The variables $CuQpOffset_{Cb}$, $CuQpOffset_{Cr}$, and $CuQpOffset_{CbCr}$, specifying values to be used when determining the respective values of the $Qp'_{Cb}$, $Qp'_{Cr}$, and $Qp'_{CbCr}$ quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header. For bitstream conformance, the value of picture_header_in__slice_header_flag may be the same in all coded slices in a CLVS.

When picture_header_in_slice_header_flag is equal to 1 for a coded slice, it is a requirement of bitstream conformance that no VCL NAL unit with nal_unit_type equal to PH_NUT may be present in the CLVS.

When picture_header_in_slice_header_flag is equal to 0, all coded slices in the current picture may have picture_header_in_slice_header_flag is equal to 0, and the current PU may have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
The slice address is the raster scan tile index.
The length of slice_address is Ceil(Log2 (NumTilesIn-Pic))bits.
The value of slice_address may be in the range of 0 to NumTilesInPic−1, inclusive.
Otherwise (rect_slice_flag is equal to 1), the following applies:
The slice address is the subpicture-level slice index of the slice.
The length of slice_address is Ceil(Log2(NumSlicesIn-Subpic[CurrSubpicIdx]))bits.
The value of slice_address may be in the range of 0 to NumSlicesInSubpic[CurrSubpicIdx]−1, inclusive.
For bitstream conformance, the following constraints apply:
If rect_slice_flag is equal to 0 or subpic_info_present_flag is equal to 0, the value of slice_address may not be equal to the value of slice_address of any other coded slice NAL unit of the same coded picture.
Otherwise, the pair of slice_subpic_id and slice_address values may not be equal to the pair of slice_subpic_id and slice_address values of any other coded slice NAL unit of the same coded picture.

The shapes of the slices of a picture may be such that each CTU, when decoded, may have its entire left boundary and entire top boundary consisting of a picture boundary or consisting of boundaries of previously decoded CTU(s).

sh_extra_bit[i] may be equal to 1 or 0. Decoders conforming to this version of this Specification may ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 may be in the range of 0 to NumTilesInPic−1, inclusive. The variable NumCtusInCurrSlice, which specifies the number of CTUs in the current slice, and the list CtbAddrInCurrSlice[i], for i ranging from 0 to NumCtusIn-CurrSlice−1, inclusive, specifying the picture raster scan address of the i-th CTB within the slice, are derived as follows:

```
if(                rect_slice_flag                 )              {
  picLevelSliceIdx                    =                 slice_address
  for(    j    =    0;    j    <    CurrSubpicIdx;    j++    )
    picLevelSliceIdx             +=             NumSlicesInSubpic[ j ]
  NumCtusInCurrSlice           =           NumCtusInSlice[ picLevelSliceIdx ]
  for(    i    =    0;    i    <    NumCtusInCurrSlice;    i++    )
    CtbAddrInCurrSlice[ i ] = CtbAddrInSlice[ picLevelSliceIdx ][ i ]      (117)
}                                   else                                {
  NumCtusInCurrSlice                   =                   0
  for( tileIdx = slice_address; tileIdx <= slice_address + num_tiles_in_slice_minus1;
  tileIdx++                           )                           {
    tileX        =        tileIdx        %        NumTileColumns
    tileY        =        tileIdx        /        NumTileColumns
    for( ctbY = tileRowBd[ tileY ];   ctbY   <   tileRowBd[ tileY + 1 ]; ctbY++ ) {
      for( ctbX = tileColBd[ tileX ];   ctbX   <   tileColBd[ tileX + 1 ]; ctbX++ ) {
        CtbAddrInCurrSlice[ NumCtusInCurrSlice ] = ctbY * PicWidthInCtb + ctbX
        NumCtusInCurrSlice+++
      }
    }
  }
}
```

The variables SubpicLeftBoundaryPos, SubpicTopBoundaryPos, SubpicRightBoundaryPos, and SubpicBotBoundaryPos are derived as follows:

```
if(         subpic_treated_as_pic_flag[ CurrSubpicIdx ]           )             {
  SubpicLeftBoundaryPos   =   subpic_ctu_top_left_x[ CurrSubpicIdx ] * CtbSizeY
  SubpicRightBoundaryPos      =      Min( pic_width_max_in_luma_samples − 1,
    ( subpic_ctu_top_left_x[ CurrSubpicIdx ] +
    subpic_width+minus1[ CurrSubpicIdx ] + 1 ) * CtbSizeY − 1 )
  SubpicTopBoundaryPos = subpic_ctu_top_left_y[ CurrSubpicIdx ] *CtbSizeY  (118)
  SubpicBotBoundaryPos        =         Min( pic_height_max_in_luma_samples − 1,
    ( subpic_ctu_top_left_y[ CurrSubpicIdx ] +
    subpic_height_minus1[ CurrSubpicIdx ] + 1 ) * CtbSizeY − 1 )
}
``` slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.
When ph_intra_slice_allowed_flag is equal to 0, the value of slice_type may be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type may be equal to 2.
The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:
 If slice_type equal to 2 (I), the following applies:

MinQtLog2SizeY=MinCbLog2SizeY+ph_log2_diff_min_qt_min_cb_intra_slice_luma  (119)

MinQtLog2SizeC=MinCbLog2SizeY+ph_log2_diff_min_qt_min_cb_intra_slice_chroma  (120)

MaxBtSizeY1<<(MinQtLog2SizeY+ph_log2_diff_max_bt_min_qt_intra_slice_luma)  (121)

MaxBtSizeC=1<<(MinQtLog2SizeC+ph_log2_diff_max_bt_min_qt_intra_slice_chroma)  (122)

MaxTtSizeY=1<<(MinQtLog2SizeY+ph_log2_diff_max_tt_min_qt_intra_slice_luma)  (123)

MaxTtSizeC=1<<(MinQtLog2SizeC+ph_log2_diff_max_tt_min_qt_intra_slice_chroma)  (124)

MaxMttDepthY=ph_max_mtt_hierarchy_depth_intra_slice_luma  (125)

MaxMttDepthC=ph_max_mtt_hierarchy_depth_intra_slice_chroma  (126)

CuQpDeltaSubdiv=ph_cu_qp_delta_subdiv_intra_slice  (127)

CuChromaQpOffsetSubdiv=ph_cu_chroma_qp_offset_subdiv_intra_slice  (128)

Otherwise (slice_type equal to 0 (B) or 1 (P)), the following applies:

MinQtLog2SizeY=MinCbLog2SizeY+ph_log2_diff_min_qt_min_cb_inter_slice  (129)

MinQtLog2SizeC=MinCbLog2SizeY+ph_log2_diff_min_qt_min_cb_inter_slice  (130)

MaxBtSizeY=1<<(MinQtLog2SizeY+ph_log2_diff_max_bt_min_qt_inter_slice)  (131)

MaxBtSizeC=1<<(MinQtLog2SizeC+ph_log2_diff_max_bt_mm_qt_inter_slice)  (132)

MaxTtSizeY=1<<(MinQtLog2SizeY+ph_log2_diff_max_tt_min_qt_inter_slice)  (133)

MaxTtSizeC=1<<(MinQtLog2SizeC+ph_log2_diff_max_tt_min_qt_inter_slice)  (134)

MaxMttDepthY=ph_max_mtt_hierarchy_depth_inter_slice  (135)

MaxMttDepthC=ph_max_mtt_hierarchy_depth_inter_slice  (136)

CuQpDeltaSubdiv=ph_cu_qp_delta_subdiv_inter_slice  (137)

CuChromaQpOffsetSubdiv=ph_cu_chroma_qp_offset_subdiv_inter_slice  (138)

The following applies:

MinQtSizeY=1<<MinQtLog2SizeY  (139)

MinQtSizeC=1<<MinQtLog2SizeC  (140)

MinBtSizeY=1<<MinCbLog2SizeY  (141)

MinTtSizeY=1<<MinCbLog2SizeY  (142)

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] may be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. The value of alf_luma_filter_signal_flag of the APS NAL unit having aps_params_type equal to ALF_APS and adaptation_parameter_set_id equal to slice_alf_aps_id_luma[i] may be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma may be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma may be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to. The TemporalId of the APS NAL unit having aps_params_type equal to ALF_APS and adaptation_parameter_set_id equal to slice_cc_alf_cb_aps_id may be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id may be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id may be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id may be equal to 1.

colour_plane_id identifies the colour plane associated with the current slice when separate_colour_plane_flag is equal to 1. The value of colour_plane_id may be in the range of 0 to 2, inclusive. colour_plane_id values 0, 1 and 2 correspond to the Y, Cb and Cr planes, respectively. The value 3 of colour_plane_id is reserved for future use by ITU-T ISO/IEC.

NOTE 1—There is no dependency between the decoding processes of different colour planes of one picture.

num_ref_idx_active_override_flag equal to 1 specifies that the syntax element num_ref_idx_active_minus1[0] is present for P and B slices and the syntax element num_ref_idx_active_minus1[1] is present for B slices. num_ref_idx_active_override_flag equal to 0 specifies that the syntax elements num_ref_idx_active_minus1[0] and num_ref_idx_active_minus1[1] are not present. When not present, the value of num_ref_idx_active_override_flag is inferred to be equal to 1.

num_ref_idx_active_minus1[i] is used for the derivation of the variable NumRefIdxActive[i] as specified by Equation 143. The value of num_ref_idx_active_minus1[i] may be in the range of 0 to 14, inclusive.

For i equal to 0 or 1, when the current slice is a B slice, num_ref_idx_active_override_flag is equal to 1, and num_ref_idx_active_minus1[i] is not present, num_ref_idx_active_minus1[i] is inferred to be equal to 0.

When the current slice is a P slice, num_ref_idx_active_override_flag is equal to 1, and num_ref_idx_active_minus1[0] is not present, num_ref_idx_active_minus1[0] is inferred to be equal to 0.

The variable NumRefIdxActive[i] is derived as follows:

```
for( i = 0; i < 2; i++ ) {
    if( slice_type == B || ( slice_type == P && i == 0 ) ) {
        if( num_ref_idx_active_override_flag )
            NumRefIdxActive[ i ] = num_ref_idx_active_minus1[ i ] + 1      (143)
        else {
            if( num_ref_entries[ i ][ RplsIdx[ i ] ] >= num_ref_idx_default_active_minus1[ i ] + 1 )
                NumRefIdxActive[ i ] = num_ref_idx_default_active_minus1[ i ] + 1
            else
                NumRefIdxActive[ i ] = num_ref_entries[ i ][ RplsIdx[ i ] ]
        }
    } else /* slice_type == I || ( slice_type == P && i == 1 ) */
        NumRefIdxActive[ i ] = 0
}
```

The value of NumRefIdxActive[i]−1 specifies the maximum reference index for reference picture list i that may be used to decode the slice. When the value of NumRefIdxActive[i] is equal to 0, no reference index for reference picture list i may be used to decode the slice. When the current slice is a P slice, the value of NumRefIdxActive[0] may be greater than 0. When the current slice is a B slice, both NumRefIdxActive[0] and NumRefIdxActive[1] may be greater than 0.

cabac_init_nag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
  If rpl_info_in_ph_flag is equal to 1, slice_collocated_from_l0_flag is inferred to be equal to ph_collocated_from_l0_flag.
  Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx may be in the range of 0 to NumRefIdxActive[0]−1, inclusive. When slice_type is equal to B and slice_collocated_from_l0_flag is equal to 0, slice_collocated_ref_idx refers to an entry in reference picture list 1, and the value of slice_collocated_ref_idx may be in the range of 0 to NumRefIdxActive[1]−1, inclusive.

When slice_collocated_ref_idx is not present, the following applies:
  If rpl_info_in_ph_flag is equal to 1, the value of slice_collocated_ref idx is inferred to be equal to ph_collocated_ref_idx.
  Otherwise (rpl_info_in_ph_flag is equal to 0), the value of slice_collocated_ref_idx is inferred to be equal to 0.

For bitstream conformance, the picture referred to by slice_collocated_ref_idx may be the same for all slices of a coded picture.

For bitstream conformance, the values of pic_width_in_luma_samples and pic_height_in_luma_samples of the reference picture referred to by slice_collocated_ref_idx may be equal to the values of pic_width_in_luma_samples and pic_height_in_luma_samples, respectively, of the current picture, and RprConstraintsActive[slice_collocated_from_l0_flag ? 0:1][slice_collocated_ref idx] may be equal to 0.

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y = 26 + init\_qp\_minus26 + slice\_qp\_delta \quad (144)$$

The value of $SliceQp_Y$ may be in the range of −QpBdOffset to +63, inclusive.

When either of the following conditions is true:
  The value of wp_info_in_ph_flag is equal to 1, pps_weighted_pred_flag is equal to 1, and slice_type is equal to P.
  The value of wp_info_in_ph_flag is equal to 1, pps_weighted_bipred_flag is equal to 1, and slice_type is equal to B.
The following applies:
  The value of NumRefIdxActive[0] may be less than or equal to the value of NumWeightsL0.
  For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:
  The value of NumRefIdxActive[1] may be less than or equal to the value of NumWeightsL1.
  For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively.

slice_cb_qp_offset specifies a difference to be added to the value of pps_cb_qp_offset when determining the value of the $Qp'_{Cb}$ quantization parameter. The value of slice_cb_qp_offset may be in the range of −12 to +12, inclusive. When slice_cb_qp_offset is not present, it is inferred to be equal to 0. The value of pps_cb_qp_offset+slice_cb_qp_offset may be in the range of −12 to +12, inclusive.

slice_cr_qp_offset specifies a difference to be added to the value of pps_cr_qp_offset when determining the value of the $Qp'_{Cr}$ quantization parameter. The value of slice_cr_qp_offset may be in the range of −12 to +12, inclusive. When slice_cr_qp_offset is not present, it is inferred to be equal to 0. The value of pps_cr_qp_offset+slice_cr_qp_offset may be in the range of −12 to +12, inclusive.

slice_joint_cbcr_qp_offset specifies a difference to be added to the value of pps_joint_cbcr_qp_offset_value when determining the value of the $Qp'_{CbCr}$. The value of slice_joint_cbcr_qp_offset may be in the range of −12 to +12, inclusive. When slice_joint_cbcr_qp_offset is not present, it is inferred to be equal to 0. The value of pps_joint_cbcr_qp_offset_value+slice_joint_cbcr_qp_offset may be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_beta_offset_div2 and slice_tc_offset_div2 specify the deblocking parameter offsets for β and tC (divided by 2) that are applied to the luma component for the current slice. The values of slice_beta_offset_div2 and slice_tc_offset_div2 may both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for β and tC (divided by 2) that are applied to the Cb component for the current slice. The values of slice_cb_beta_offset_div2 and slice_cb_tc_offset_div2 may both be in the range of −12 to 12, inclusive. When not present, the values of slice_cb_beta_offset_div2 and slice_cb_tc_offset_div2 are inferred to be equal to ph_cb_beta_offset_div2 and ph_cb_tc_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 may both be in the range of −12 to 12, inclusive. When not present, the values of slice_cr_beta_offset_div2 and slice_cr_tc_offset_div2 are inferred to be equal to ph_cr_beta_offset_div2 and ph_cr_tc_offset_div2, respectively.

slice_ts_residual_coding_disabled_flag equal to 1 specifies that the residual_coding( ) syntax structure is used to parse the residual samples of a transform skip block for the current slice. slice_ts_residual_coding_disabled_flag equal to 0 specifies that the residual_ts_coding( ) syntax structure is used to parse the residual samples of a transform skip block for the current slice. When slice_ts_residual_coding_disabled_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. The slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtusInCurrSlice; i++ )    {
   ctbAddrX    =    CtbAddrInCurrSlice[ i ]    %    PicWidthInCtbsY
   ctbAddrY    =    CtbAddrInCurrSlice[ i ]    /    PicWidthinCtbsY
(145)  prevCtbAddrX = CtbAddrInCurrSlice[ i − 1 ]   % PicWidthInCtbsY
   prevCtbAddrY    = CtbAddrinCurrSlice[ i − 1 ]   / PicWidthInCtbsY
   if( CtbToTileRowBd[ ctbAddrY ] != CtbToTileRowBd[ prevCtbAddrY ]    | |
       CtbToTileColBd[ ctbAddrX ] != CtbToTileColBd[ prevCtbAddrX ]   | |
       (    ctbAddrY    !=    prevCtbAddrY    &&
sps_wpp_entry_point_offsets_present_flag    )    )
      NumEntryPoints++
}
``` offset_len_minus1 plus 1 specifies the length, in bits, of the entry_point_offset_minus1[i] syntax elements. The value of offset_len_minus11 may be in the range of 0 to 31, inclusive.

entry_point_offset_minus1[i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[0], inclusive, of the coded slice data, subset k, with k in the range of 1 to NumEntryPoints−1, inclusive, consists of bytes firstByte[k] to lastByte[k], inclusive, of the coded slice data with firstByte[k] and lastByte[k] defined as:

$$\text{firstByte}[k]=\Sigma_{n=1}^{k}(\text{entry\_point\_offset\_minus1}[n-1]+1) \quad (146)$$

$$\text{lastByte}[k]=\text{firstByte}[k]+\text{entry\_point\_offset\_minus1}[k] \quad (147)$$

The last subset (with subset index equal to NumEntryPoints) consists of the remaining bytes of the coded slice data.

When sps_entropy_coding_sync_enabled_flag is equal to 0 and the slice contains one or more complete tiles, each subset may consist of all coded bits of all CTUs in the slice that are within the same tile, and the number of subsets (i.e., the value of NumEntryPoints+1) may be equal to the number of tiles in the slice.

When sps_entropy_coding_sync_enabled_flag is equal to 0 and the slice contains a subset of CTU rows from a single tile, the NumEntryPoints may be 0, and the number of subsets may be 1. The subset may consist of all coded bits of all CTUs in the slice.

When sps_entropy_coding_sync_enabled_flag is equal to 1, each subset k with k in the range of 0 to NumEntryPoints, inclusive, may consist of all coded bits of all CTUs in a CTU row within a tile, and the number of subsets (i.e., the value of NumEntryPoints+1) may be equal to the total number of tile-specific CTU rows in the slice.

slice_header_extension_length specifies the length of the slice header extension data in bytes, not including the bits used for signalling slice_header_extension_length itself. The value of slice_header_extension_length may be in the range of 0 to 256, inclusive. When not present, the value of slice_header_extension_length is inferred to be equal to 0.

slice_header_extension_data_byte[i] may have any value. Decoders conforming to this version of this Specification may ignore the values of all the slice_header_extension_data_byte[i] syntax elements. Its value does not affect decoder conformance to profiles specified in this version of specification.

3.3. Weighted Prediction Syntax and Semantics

In the latest VVC draft text, the weighted prediction syntax and semantics are as follows:

|  | Descriptor |
| --- | --- |
| pred_weight_table( ) { |  |
|   luma_log2_weight_denom | ue(v) |
|   if( ChromaArrayType != 0 ) |  |
|     delta_chroma_log2_weight_denom | se(v) |
|   if( wp_info_in_ph_flag ) |  |
|     num_l0_weights | ue(v) |

-continued

| | Descriptor |
|---|---|
| ```
for( i = 0; i <
NumWeightsL0; i++ )
  luma_weight_l0_flag[ i ]
if( ChromaArrayType
!= 0 )
  for( i = 0, i <
NumWeightsL0; i++ )
    chroma_weight_
    l0_flag[ i ]
for( i = 0; i <
NumWeightsL0; i++ ) {
  if( luma_weight_
  l0_flag[ i ] ) {
    delta_luma_
    weight_l0[ i ]
    luma_offset_l0[ i ]
  }
  if( chroma_weight_
  l0_flag[ i ] )
    for( j = 0; j < 2; j++ ) {
      delta_chroma_
      weight_l0[ i ][ j ]
      delta_chroma_
      offset_l0[ i ][ j ]
    }
}
if( wp_info_in_ph_flag )
  num_l1_weights
for( i = 0; i <
NumWeightsL1; i++ )
  luma_weight_l1_flag[ i ]
if( ChromaArrayType != 0 )
  for( i = 0, i <
NumWeightsL1, i++ )
    chroma_weight_
    l1_flag[ i ]
for( i = 0; i <
NumWeightsL1; i++ ) {
  if( luma_weight_
  l1_flag[ i ] ) {
    delta_luma_
    weight_l1[ i ]
    luma_offset_l1[ i ]
  }
  if( chroma_weight_
  l1_flag[ i ] )
    for( j = 0; j < 2; j++ ) {
      delta_chroma_
      weight_l1[ i ][ j ]
      delta_chroma_
      offset_l1[ i ][ j ]
    }
}
}
``` | u(1)<br><br><br>u(1)<br><br><br><br>se(v)<br>se(v)<br><br><br><br>se(v)<br>se(v)<br><br><br><br>ue(v)<br><br><br>u(1)<br><br><br><br>u(1)<br><br><br><br>se(v)<br>se(v)<br><br><br><br>se(v)<br>se(v) | luma_log2_weight_denom is the base 2 logarithm of the denominator for all luma weighting factors. The value of luma_log2_weight_denom may be in the range of 0 to 7, inclusive.

delta_chroma_log2_weight_denom is the difference of the base 2 logarithm of the denominator for all chroma weighting factors. When delta_chroma_log2_weight_denom is not present, it is inferred to be equal to 0.

The variable ChromaLog2WeightDenom is derived to be equal to luma_log2_weight_denom+delta_chroma_ log2_weight_denom and the value may be in the range of 0 to 7, inclusive.

num_l0_weights specifies the number of weights signalled for entries in reference picture list 0 when wp_info_in_3h_flag is equal to 1. The value of num_l0_weights may be in the range of 0 to num_ref_entries[0][RplsIdx[0]], inclusive.

If wp_info_in_ph_flag is equal to 1, the variable NumWeightsL0 is set equal to num_l0_weights. Otherwise (wp_info_in_ph_flag is equal to 0), NumWeightsL0 is set equal to NumRefIdxActive[0].

luma_weight_l0_flag[i] equal to 1 specifies that weighting factors for the luma component of list 0 prediction using RefPicList[0][i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] may be in the range of −128 to 127, inclusive. When luma_weight_l0_flag[i] is equal to 0, LumaWeightL0[i] is inferred to be equal to $2^{luma\_log2\_weight\_denom}$.

luma_offset_l0[i] is the additive offset applied to the luma prediction value for list 0 prediction using RefPicList[0][i]. The value of luma_offset_l0[i] may be in the range of −128 to 127, inclusive. When luma_weight_l0_flag[i] is equal to 0, luma_offset_l0[i] is inferred to be equal to 0.

delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma weight_l0[i][j] may be in the range of −128 to 127, inclusive. When chroma_weight_l0_flag[i] is equal to 0, ChromaWeightL0[i][j] is inferred to be equal to $2^{ChromaLog2WeightDenom}$.

delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows:

$$ChromaOffsetL0[i][j] = Clip3(-128, 127, (128 + delta\_chroma\_offset\_l0[i][j] - ((128 * ChromaWeightL0[i][j]) >> ChromaLog2WeightDenom)))$$ (148)

The value of delta_chroma_offset_l0[i][j] may be in the range of −4*128 to 4*127, inclusive. When chroma_weight_l0_flag[i] is equal to 0, ChromaOffsetL0[i][j] is inferred to be equal to 0.

num_l1_weights specifies the number of weights signalled for entries in reference picture list 1 when wp_info_in_ph_ flag is equal to 1. The value of num_l1_weights may be in the range of 0 to num_ref_entries[1][RplsIdx[1]], inclusive. If wp_info_in_ph_flag is equal to 1, the variable NumWeightsL1 is set equal to num_l1_weights. Otherwise (wp_info_in_ph_flag is equal to 0), NumWeightsL1 is set equal to NumRefIdxActive[1].

luma_weight_l1_flag[i], chroma_weight_l1_flag[i], delta_luma_weight_l1[i], luma_offset_l1[i], delta_chroma_weight_l1[i][j], and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma weight_l0_flag[i], for i=0 . . . NumRefIdxActive[0]−1. When slice_type is equal to B, the variable sumWeightL1Flags is derived to be equal to the sum of luma_weight_l1_flag[i]+2*chroma weight_l1_flag[i], for i=0 . . . NumRefIdxActive[1]−1.

For bitstream conformance, when slice_type is equal to P, sumWeightL0Flags may be less than or equal to 24 and when slice_type is equal to B, the sum of sumWeightL0Flags and sumWeightL1Flags may be less than or equal to 24.

4. Examples of Technical Problems Solved by Disclosed Technical Solutions

The existing designs for PPS, PH, and SH syntax have the following problems:

1) In the pred_weight_table( ) syntax in the latest VVC draft text, the syntax element num_l1_weights is signalled when wp_info_in_ph_flag is equal to 1, even when pps_weighted_pred_flag is equal to 1 but pps_weighted_bipred_flag is equal to 0. Consequently, under the same condition, a list of the syntax element uma_weight_l1_flag[i] is also be signalled, and lists of the syntax elements luma_weight_l1_flag[i], chroma_weight_l1_flag[i], delta_luma_weight_l1[i], luma_offset_l1[i], delta_chroma_weight_l1[i][j], and delta_chroma_offset_l1[i][j] may also be signalled. However, when pps_weighted_bipred_flag is equal to 0, weighted prediction is not applied for B slices, therefore all these signalled syntax elements may be useless.
2) When wp_info_in_ph_flag is equal to 1 (in this case at least one of pps_weighted_pred_flag and pps_weighted_bipred_flag is equal to 1), the pred_weight_table( ) syntax structure is present in the PH syntax structure of pictures referring to the PPS. In this case, when pps_weighted_pred_flag is equal to 0 (in this case pps_weighted_bipred_flag is equal to 1), although the list of luma_weight_l0_flag[i] syntax elements is signalled in the PH syntax structure, for P slices weighted prediction is not applied, hence the values of the list of luma_weight_l0_flag[i] syntax elements for P slices should be inferred to be equal to 0. Similarly, when pps_weighted_bipred_flag is equal to 0 (in this case pps_weighted_pred_flag is equal to 1), since weighted prediction is not applied for B slices, both the list of luma_weight_l0_flag[i] syntax elements and the list of luma_weight_l_flag[i] syntax elements for B slices should be inferred to be equal to 0.
3) When wp_info_in_ph_flag is equal to 1 (in this case at least one of pps_weighted_pred_flag and pps_weighted_bipred_flag is equal to 1), the pred_weight_table( ) syntax structure is present in the PH syntax structure of pictures referring to the PPS. In this case, if a picture has no B slices, while at the same time pps_weighted_bipred_flag is equal to 1, all the syntax elements in the pred_weight_table( ) syntax structure for reference picture list 1 may be useless.

5. Examples of Techniques and Embodiments

To solve the above problems, methods as summarized below are disclosed. The embodiments should be considered as examples to explain the general concepts and should not be interpreted in a narrow way. Furthermore, these embodiments can be applied individually or combined in any manner. In the following techniques and embodiments, the most relevant parts that have been added or modified are shown in __*underline, bolded and italicized text,*__ and the most relevant removed parts are highlighted in enclosed in bolded double brackets, e.g., [[a]] indicates that "a" has been removed.

1. Regarding the signalling of weighted prediction related syntax elements:
   1) To solve the first problem, whether to signal the number of weights for entries in reference picture list 1 and/or luma/chroma weights for entries in reference picture list 1 may depend on the enabling of explicit weighted prediction to B slices.
      a. In one example, in the pred_weight_table( ) syntax, the following syntax:

|  | Descriptor |
|---|---|
| if( wp_info_in_ph_flag )<br>  num_l1_weights | ue(v) | is changed to be as follows:

|  | Descriptor |
|---|---|
| if( pps_weighted_bipred_flag<br>  && wp_info_in_ph_flag )<br>  num_l1_weights | ue(v) |

And the following semantics:

num_l1_weights specifies the number of weights signalled for entries in reference picture list 1 when wp_info_in_ph_flag is equal to 1. The value of num_l1_weights may be in the range of 0 to num_ref_entries[1][RplsIdx[1]], inclusive.

If wp_info_in_ph_flag is equal to 1, the variable NumWeightsL1 is set equal to num_l1_weights. Otherwise (wp_info_in_ph_flag is equal to 0), NumWeightsL1 is set equal to NumRefIdxActive[1].

May be changed as follows:

num_l1_weights specifies the number of weights signalled for entries in reference picture list 1 __*when pps_weighted_bipred_flag and wp_info_in_ph_flag are both equal to 1.*__. The value of num_l1_weights may be in the range of 0 to num_ref_entries[1][RplsIdx[1]], inclusive. __*The variable NumWeightsL1 is derived as follows:*__
__*if( !pps_weighted_bipred_flag )*__
  __*NumWeightsL1 = 0*__
__*else if(wp_info_in_ph_flag)  (xxx)*__

*NumWeightsL1     =   num_l1_weights* else
*NumWeightsL1 =NumRefIdxActive[ 1 ]*

2) To solve the second problem, in the slice header semantics, the following inferences may be added for luma_weight_l0_flag[i], chroma_weight_l0_flag[i], luma_weight_l1_flag[i], and chroma weight_l1_flag[i]:
   a. When pps_weighted_pred_flag is equal to 0 and slice_type is equal to P, for each value of i in the range of 0 to NumRefIdxActive[0]−1, inclusive, the value of luma_weight_l0_flag[i] is inferred to be equal to 0, and the value of chroma_weight_l0_flag[i] is inferred to be equal to 0.
   b. When pps_weighted bipred_flag is equal to 0 and slice_type is equal to B, for each value of i in the range of 0 to NumRefIdxActive[0]−1, inclusive, the value of luma_weight_l0_flag[i] is inferred to be equal to 0, and the value of chroma_weight_l0_flag[i] is inferred to be equal to 0.
   c. Alternatively, furthermore, when pps_weighted_bipred_flag is equal to 0 and slice_type is equal to B, for each value of i in the range of 0 to NumRefIdxActive[1]−1, inclusive, the value of luma_weight_l1_flag[i] is inferred to be equal to 0, and the value of chroma_weight_l0_flag[i] is inferred to be equal to 0.

3) To solve the third problem, the following alternative approaches may be applied:
   a. The above bullet item 2.1 applies, and for pictures that do not have B slices, the encoder forces them to refer to PPSs that have pps_weighted_bipred_flag equal to 0. The latter part can be realized by adding the following constraint: A picture that contains no B slices may only refer to a PPS that has pps_weighted_bipred_flag equal to 0.
   b. For pictures that do not have B slices, the encoder forces them to refer to PPSs that have wp_info_in_ph_flag equal to 0. This can be realized by adding the following constraint: A picture that contains no B slices may only refer to a PPS that has wp_info_in_ph_flag is equal to 0.
   c. For pictures that do not have B slices, the encoder forces the value of the syntax element num_l1_weights in the pred_weight_table( ) syntax structure to be equal to 0. This can be realized by adding the following constraint as part of the semantics of num_l1_weights: When wp_info_in_ph_flag is equal to 1 and the current picture contains no B slices, the value of num_l1_weights may be equal to 0.

4) An indication of explicit weighted prediction being enabled may be signalled in the SPS using one flag.
   a. Alternatively, furthermore, this one-flag SPS indication may be used to condition the signalling of the indications of explicit weighted prediction for P and B slices (i.e., sps_weighted_pred_flag and sps_weighted_bipred_flag) in the SPS.
   b. Alternatively, one or multiple constraint flags may be added to the general constraint information syntax to indicate constraints on explicit weighted prediction.
      i. In one example, one constraint flag, e.g., named no_explicit_weighted_prediction_constraint_flag, is added, and when the constraint flag indicates that explicit weighted prediction for both P slices and B slices (or just for P slice or just for B slices) is not applied, the corresponding SPS flag(s) may be equal to 0.

5) An indication of explicit weighted prediction being enabled may be signalled in the PPS using one flag.
   a. Alternatively, furthermore, this one-flag PPS indication may be used to condition the signalling of the indications of explicit weighted prediction for P and B slices (i.e., pps_weighted_pred_flag and pps_weighted_bipred_flag) in the PPS.
   b. Alternatively, one or multiple constraint flags may be added to the general constraint information syntax to indicate constraints on explicit weighted prediction.
      i. In one example, one constraint flag, e.g., named no_explicit_weighted_prediction_constraint_flag, is added, and when the constraint flag indicates that explicit weighted prediction for both P slices and B slices (or just for P slice or just for B slices) is not applied, the corresponding PPS flag(s) may be equal to 0.

6) Indications of explicit weighted prediction being applied to P or B slices may be signalled in the picture header or the slice header instead of being signalled in the SPS and the PPS.
   a. In one example, whether to signal such indications in picture headers or slice headers may follow where RPL is present, i.e., may depend on whether RPL information is present in the PH syntax structure or in the SH syntax structure (e.g., according to the value of rpl_info_in_ph_flag).
   b. Alternatively, furthermore, whether to signal such indications may depend on the slices type.
   c. Alternatively, furthermore, whether to signal such indications may depend on whether the current picture may include inter slices or P slices or B slices.

2. Regarding an indication of whether a picture does not contain B slices and the use of this indication to skip the signalling of some syntax elements:
   1) An indication of whether the current picture does not contain B slices may be added to the PH syntax structure.
      a. In one example, this indication is a flag, e.g., named ph_b_slices_allowed_flag, ph_b_slices_allowed_flag equal to 1 specifies that the picture may contain one or more B slices, and ph_b_slices_allowed_flag equal to 0 specifies that the picture does not contain B slices.
         i. Alternatively, furthermore, ph_b_slices_allowed_flag may be signalled in the PH syntax structure only when ph_inter_slice_allowed_flag is equal to 1.
         ii. Alternatively, furthermore, when ph_inter_slice_allowed_flag is equal to 0, the value of ph_b_slices_allowed_flag may be inferred to be equal to 0.
      b. In one example, when ph_b_slices_allowed_flag is equal to 0, the syntax elements for reference picture list 1 in the ref_pic_lists( ) syntax and the ref_pic_list_struct( ) syntax may be skipped.
      c. In one example, when ph_b_slices_allowed_flag is equal to 0, the syntax element mvd_l1_zero_flag in the PH syntax structure may be skipped.
         i. Alternatively, furthermore, when ph_b_slices_allowed_flag is equal to 0, the value of mvd_l1_zero_flag may be inferred to be equal to 1.
      d. In one example, when ph_b_slices_allowed_flag is equal to 0, the syntax element num_l1_weights as well as other parameters in the pred_weight_table( ) syntax for reference picture list 1 may be skipped.
  i. Alternatively, furthermore, when ph_b_slices_allowed_flag is equal to 0, the value of num_l1_weights may be inferred to be equal to 0.
e. In one example, when ph_b_slices_allowed_flag is equal to 0, the syntax element num_ref_idx_active_minus1[1] in the SH syntax may be skipped.
  i. Alternatively, furthermore, when ph_b_slices_allowed_flag is equal to 0, the value of NumRefIdxActive[1] may be inferred to be equal to 0.
f. In one example, when ph_b_slices_allowed_flag is equal to 0, the syntax element slice_collocated_from_l0_flag in the SH syntax may be skipped.
  i. Alternatively, furthermore, when ph_b_slices_allowed_flag is equal to 0, the value of slice_collocated_from_l0_flag may be inferred to be equal to 1.

6. Embodiments

Below are some example embodiments for some of the aspects summarized above in Section 5, which can be applied to the VVC specification. The changed texts are based on the latest VVC text in JVET-Q2001-vC Most relevant parts that have been added or modfed are shown in _underline, bolded and italicized text,_, and the most relevant removed parts are highlighted in enclosed in bolded double brackets, e.g., *[[a]]* indicates that "a" has been removed. here are some other changes that are editorial in nature and thus not highlighted.

6.1. First Embodiment

This is an embodiment of items 1.1, 1.1.a, 1.2.a, and 1.2.b summarized above in Section 5.

7.3.7.2 Weighted Prediction Parameters Syntax

|  | Descriptor |
|---|---|
| pred_weight_table( ) { |  |
|   luma_log2_weight_denom | ue(v) |
|   if( ChromaArrayType != 0 ) |  |
|     delta_chroma_ | se(v) |
|       log2_weight_denom |  |
|   if( wp_info_in_ph_flag ) |  |
|     num_l0_weights | ue(v) |
|   for( i = 0; i < NumWeightsL0; i++ ) |  |
|     luma_weight_l0_flag[ i ] | u(1) |
|   if( ChromaArrayType != 0 ) |  |
|     for( i = 0; i < NumWeightsL0; i++ ) |  |
|       chroma_weight_ | u(1) |
|         l0_flag[ i ] |  |
|   for( i = 0; i < NumWeightsL0; i++ ) { |  |
|     if( luma_weight_ |  |
|       l0_flag[ i ] ) { |  |
|       delta_luma_ | se(v) |
|         weight_l0[ i ] |  |
|       luma_offset_l0[ i ] | se(v) |
|     } |  |

|  | Descriptor |
|---|---|
| -continued |  |
|     if( chroma_weight_ |  |
|       l0_flag[ i ] ) |  |
|       for( j = 0; j < 2; j++ ) { |  |
|         delta_chroma_ | se(v) |
|           weight_l0[ i ][ j ] |  |
|         delta_chroma_ | se(v) |
|           offset_l0[ i ][ j ] |  |
|       } |  |
|   } |  |
|   if( _pps_weighted bipred flag &&_ wp_info_in_ph_flag ) |  |
|     num_l1_weights | ue(v) |
|   for( i = 0; i < NumWeightsL1; i++ ) |  |
|     luma_weight_l1_flag[ i ] | u(1) |
|   if( ChromaArrayType != 0 ) |  |
|     for( i = 0; i < NumWeightsL1; i++ ) |  |
|       chroma_weight_ | u(1) |
|         l1_flag[ i ] |  |
|   for( i = 0, i < NumWeightsL1, i++ ) { |  |
|     if( luma_weight_ |  |
|       l1_flag[ i ] ) { |  |
|       delta_luma_ | se(v) |
|         weight_l1[ i ] |  |
|       luma_offset_l1[ i ] | se(v) |
|     } |  |
|     if( chroma_ |  |
|       weight_l1_flag[ i ] ) |  |
|       for( j = 0; j < 2; j++ ) { |  |
|         delta_chroma_ | se(v) |
|           weight_l1[ i ][ j ] |  |
|         delta_chroma_ | se(v) |
|           offset_l1[ i ][ j ] |  |
|       } |  |
|   } |  |
| } |  |

7.4.8.2 Weighted Prediction Parameters Semanitcs
luma_log2_weight_denom is the base 2 logarithm of the denominator for all luma weighting factors. The value of luma_log2_weight_denom may be in the range of 0 to 7, inclusive.
delta_chroma_log2_weight_denom is the difference of the base 2 logarithm of the denominator for all chroma weighting factors. When delta_chroma_log2_weight_denom is not present, it is inferred to be equal to 0.
The variable ChromaLog2WeightDenom is derived to be equal to luma_log2_weight_denom+delta_chroma_log2_weight_denom and the value may be in the range of 0 to 7, inclusive.
num_l0_weights specifies the number of weights signalled for entries in reference picture list 0 when wp_info_in_ph_flag is equal to 1. The value of num_l0_weights may be in the range of 0 to num_ref_entries[0][RplsIdx[0]], inclusive. If wp_info_in_ph_flag is equal to 1, the variable NumWeightsL0 is set equal to num_l0_weights. Otherwise (wp_info_in_ph_flag is equal to 0), NumWeightsL0 is set equal to NumRefIdxActive[0].
luma_weight_l0_flag[i] equal to 1 specifies that weighting factors for the luma component of list 0 prediction using RefPicList[0][i] are present. luma weight_l0_flag[i] equal to 0 specifies that these weighting factors are not present.
chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

num_l1_weights spe a umber of weights signalled for entries in reference picture list 1 when pps_weighted_bipred_flag and wp_info_in_ph_flag are both [[is]] equal to 1. The value of num_l1_weights may be in the range of 0 to num_ref_entries[1][RplsIdx[1]], inclusive. [[If wp_info_in_ph_flag is equal to 1, the variable NumWeightsL1 is set equal to num_l1 weights. Otherwise (wp_info_in_ph_flag is equal to 0), NumWeightsL1 is set equal to NumRefIdxActive[1].]] The variable NumWeightsL1 is derived as follows:
if( !pps_weighted_bipred_flag ) NumWeightsL1 = 0
else if( wp_info_in_ph_flag ) NumWeightsL1 = num_l1_weights else NumWeightsL1 =NumRefIdxActive[ 1 ]

. . .

7.4.8.1 General Slice Header Semantics

. . .

slice_qp_delta specifies the initial value of $Qp_Y$ to be used for the coding blocks in the slice until modified by the value of CuQpDeltaVal in the coding unit layer.

When qp_delta_info_in_ph_flag is equal to 0, the initial value of the $Qp_Y$ quantization parameter for the slice, $SliceQp_Y$, is derived as follows:

$$SliceQp_Y=26+init\_qp\_minus26+slice\_qp\_delta \qquad (144)$$

The value of $SliceQp_Y$ may be in the range of −QpBdOffset to +63, inclusive.

When either of the following conditions is true:
 The value of wp_info_in_ph_flag is equal to 1, pps_weighted_pred_flag is equal to 1, and slice_type is equal to P.
 The value of wp_info_in_ph_flag is equal to 1, pps_weighted_bipred_flag is equal to 1, and slice_type is equal to B.

The following applies:
The value of NumRefIdxActive[0] may be less than or equal to the value of NumWeightsL0.
 For each reference picture index RefPicList[0][i] for i in the range of 0 to NumRefIdxActive[0]−1, inclusive, the luma weight, Cb weight, and Cr weight that apply to the reference picture index are LumaWeightL0[i], ChromaWeightL0[0][i], and ChromaWeightL0[1][i], respectively.

When wp_info_in_ph_flag is equal to 1, pps_weighted_bipred_flag is equal to 1, and slice_type is equal to B, the following applies:
 The value of NumRefIdxActive[1] may be less than or equal to the value of NumWeightsL1.
 For each reference picture index RefPicList[1][i] for i in the range of 0 to NumRefIdxActive[1]−1, inclusive, the luma weight, Cb weight, and Cr weight that apply to the reference picture index are LumaWeightL1[i], ChromaWeightL1[0][i], and ChromaWeightL1[1][i], respectively. When either of the following conditions is true, for each value of i in the range of 0 to NumRefIdxActive[ 0 ] - 1, inclusive, the values of luma_weight_l0_flag[ i ] and chroma_weight_l0_flag[ i ] are both inferred to be equal to 0:
The value of wp_info_in_ph_flag is equal to 1, pps_weighted_pred_flag is equal to 0, and
slice_type is equal to P. The value of wp_info_in_ph_flag is equal to 1, pps_weighted_bipred_flag is equal to 0, and slice_type is equal to B.

. . . [retain remaining text from the standards document]

FIG. 1 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 2:
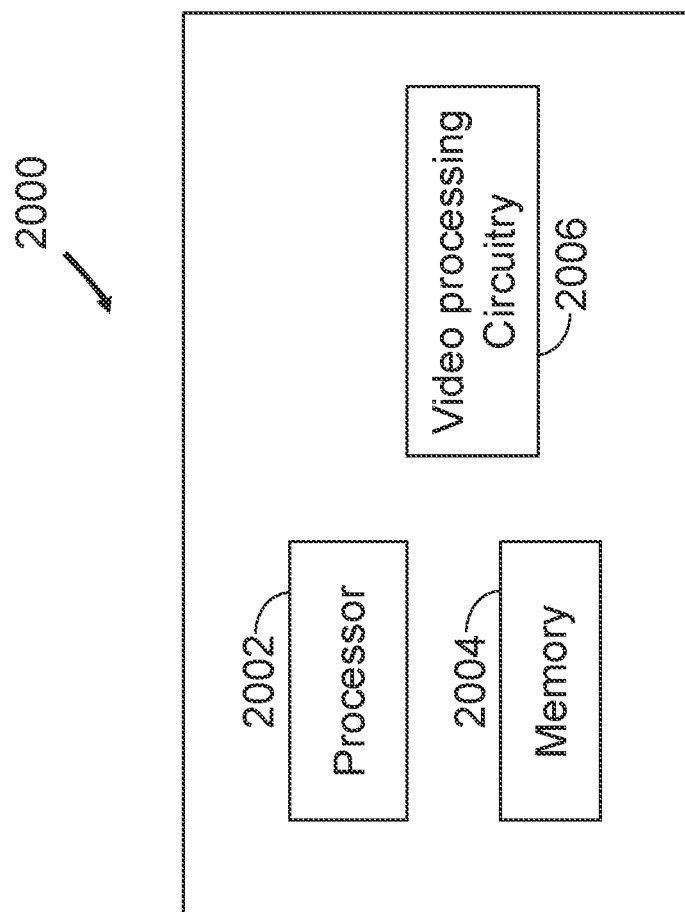
FIG. 2 is a block diagram of an example hardware platform used for video processing.

FIG. 2 is a block diagram of a video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing hardware 2006. The processor(s) 2002 may be configured to implement one or more methods described in the present document (e.g., in FIGS. 6-10). The memory (memories) 2004 may be used for storing data and code used for implementing the methods and techniques described herein. The video processing hardware 2006 may be used to implement, in hardware circuitry, some techniques described in the present document. In some embodiments, the hardware 2006 may be partly or entirely in the processors 2002, e.g., a graphics processor.

Figure 3:
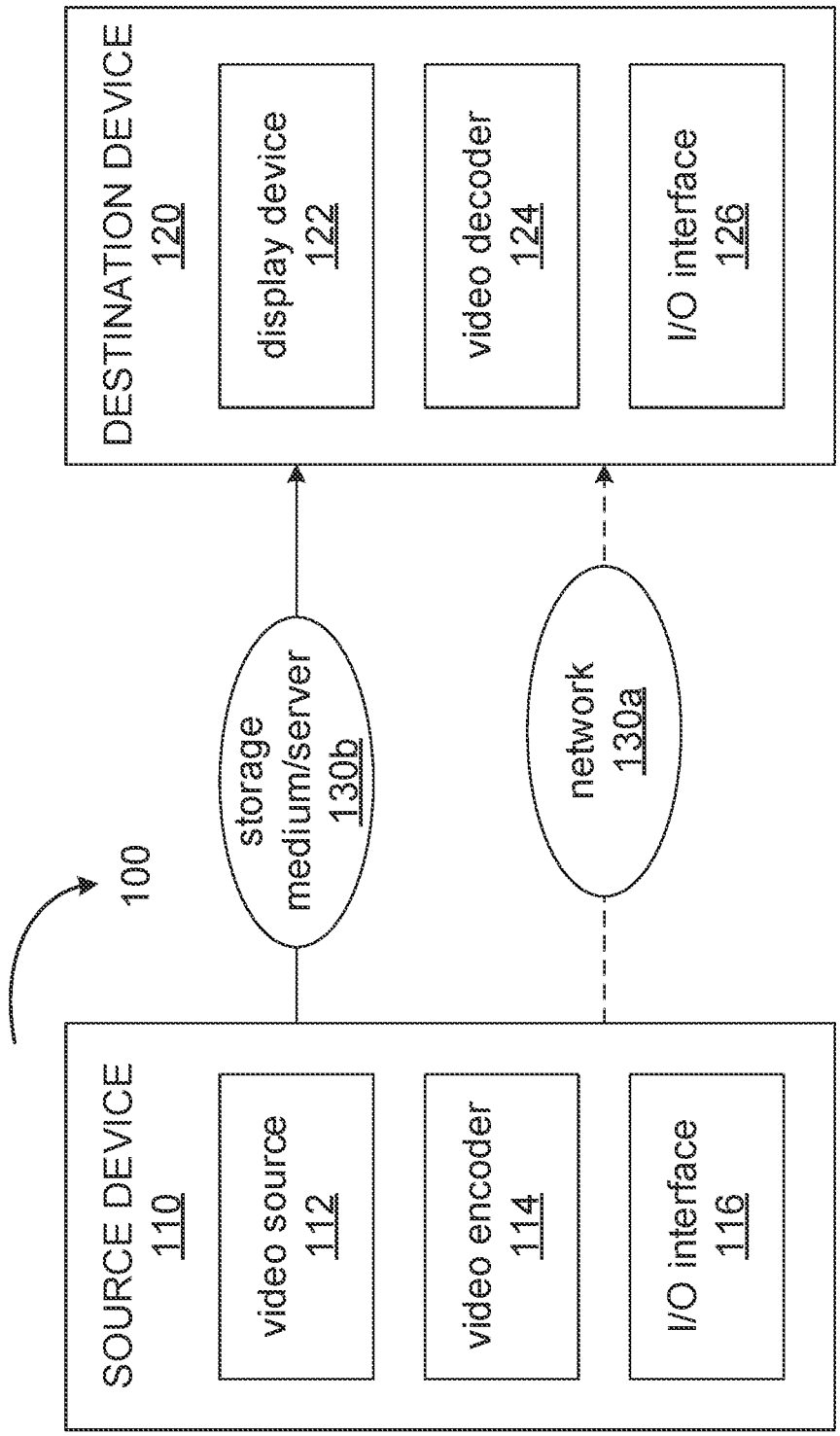
FIG. 3 is a block diagram that illustrates an example video coding system according to various embodiments of the present disclosure.

FIG. 3 is a block diagram that illustrates an example video coding system 100 that may utilize the techniques of this disclosure. As shown in FIG. 3, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. U/O interface 116 may include a modulator/demodulator (modem) and/or a transmitter. The encoded video data may be transmitted directly to destination device 120 via 110 interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which may be configured to interface with an external display device.

Video encoder 114 and video decoder 124 may operate according to a video compression standard, such as the High Efficiency Video Coding (HEVC) standard, Versatile Video Coding(VVM) standard and other current and/or further standards.

Figure 4:
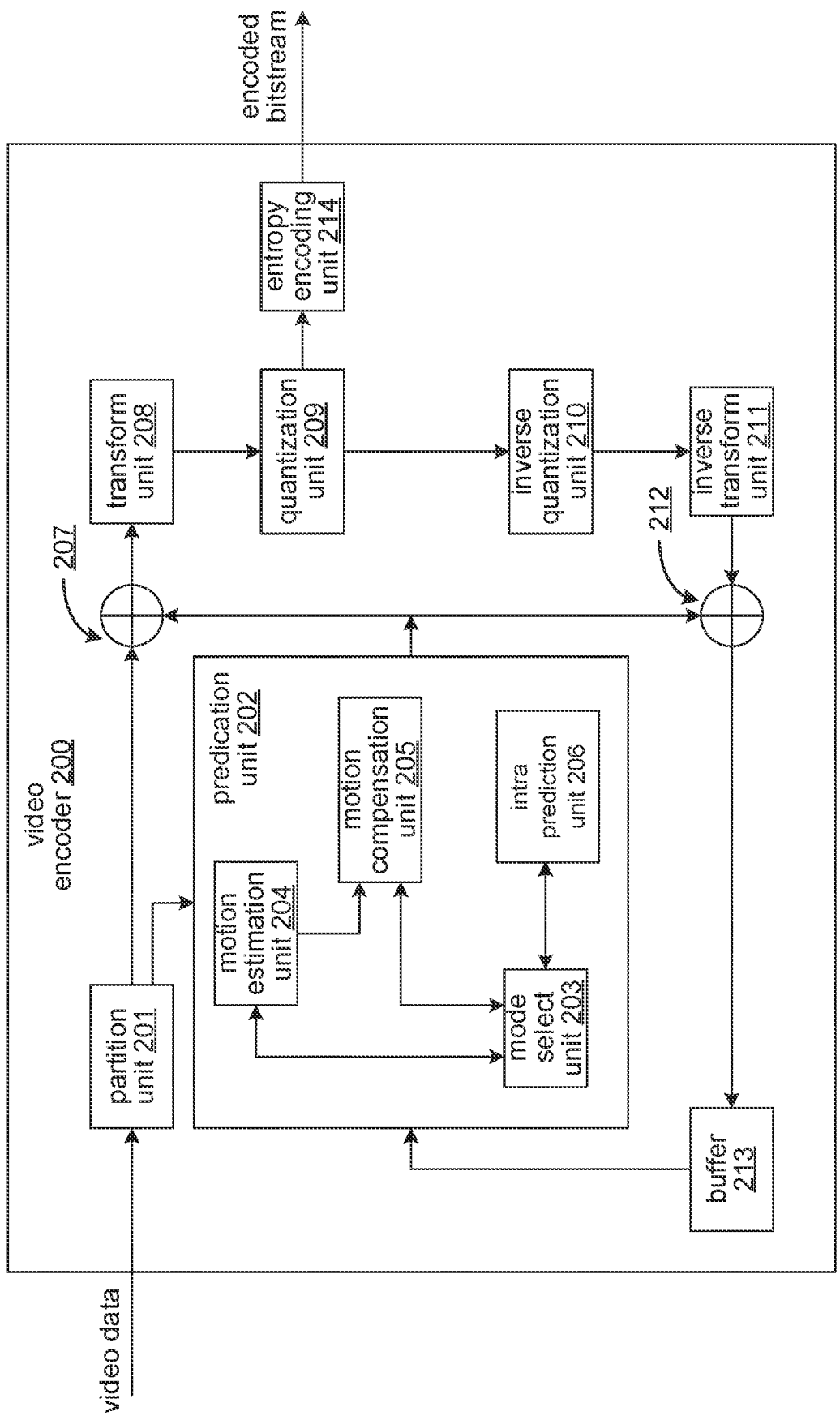
FIG. 4 is a block diagram that illustrates an example of an encoder according to various embodiments of the present disclosure.

FIG. 4 is a block diagram illustrating an example of video encoder 200, which may be video encoder 114 in the system 100 illustrated in FIG. 3.

Video encoder 200 may be configured to perform any or all of the techniques of this disclosure. In the example of FIG. 4, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 4 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 5:
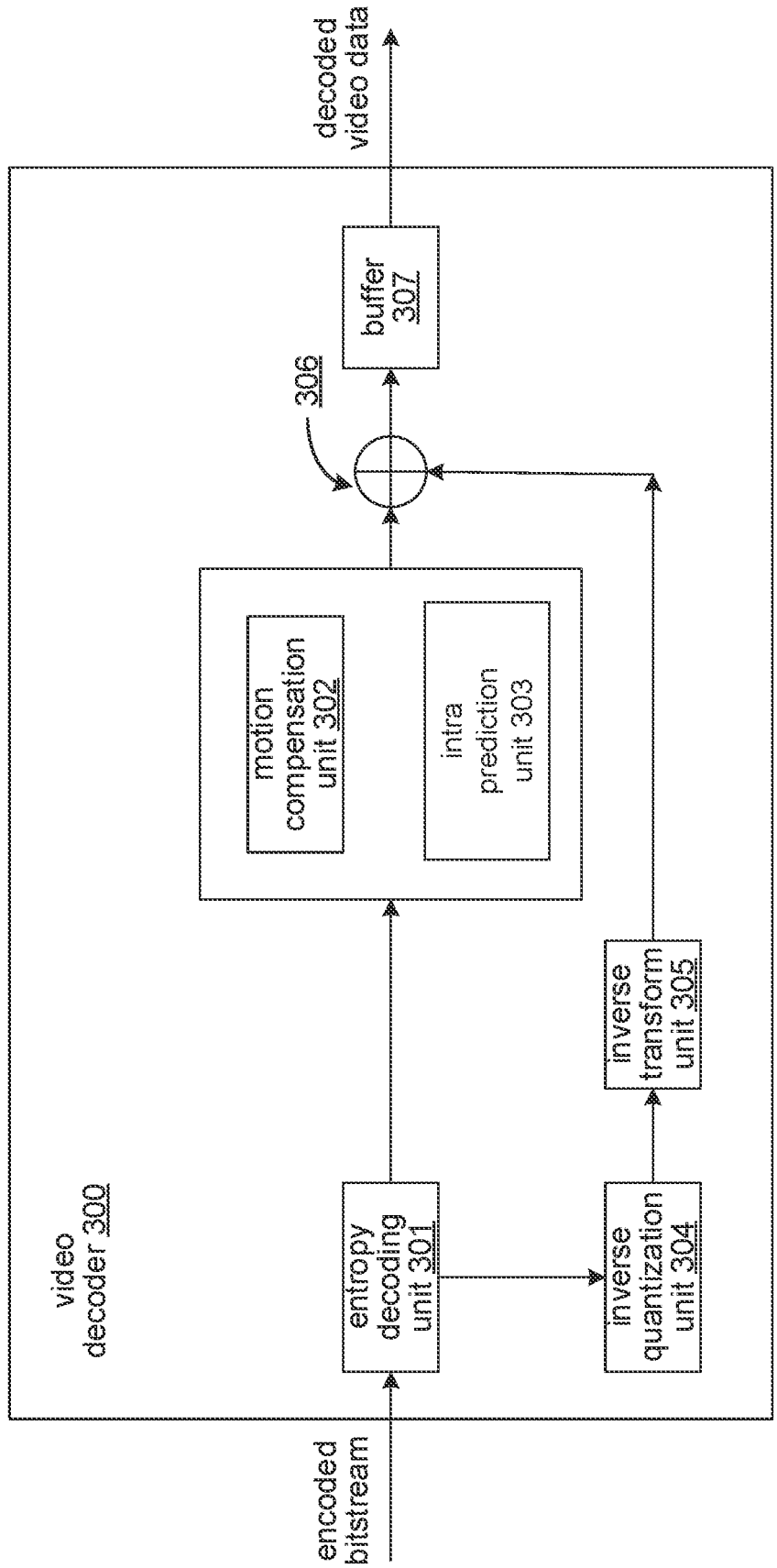
FIG. 5 is a block diagram that illustrates an example of a decoder according to various embodiments of the present disclosure.

FIG. 5 is a block diagram illustrating an example of video decoder 300 which may be video decoder 124 in the system 100 illustrated in FIG. 3.

The video decoder 300 may be configured to perform any or all of the techniques of this disclosure. In the example of FIG. 5, the video decoder 300 includes a plurality of functional components. The techniques described in this disclosure may be shared among the various components of the video decoder 300. In some examples, a processor may be configured to perform any or all of the techniques described in this disclosure.

In the example of FIG. 5, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 4).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

FIGS. 6-10 show example methods that can implement the technical solution described above in, for example, the embodiments shown in FIGS. 1-5.

FIG. 6 shows a flowchart for an example method 600 of video processing. The method 600 includes, at operation 610, performing a conversion, according to a rule, between a current slice of a current picture of a video and a bitstream of the video, the rule specifying that a value of a first syntax element of a picture parameter set (PPS) and a value of a second syntax element of the PPS control whether a third syntax element is included in the bitstream, the first syntax element indicating whether a weighted prediction is enabled for bi-directional slices (B slices) of coded pictures in the bitstream referring to the PPS, the second syntax element indicating whether information related to the weighted prediction is present in picture headers or slice headers of coded pictures referring to the PPS, and the third syntax element indicating a number of weights associated with a reference picture list 1 of the current slice.

Figure 7:
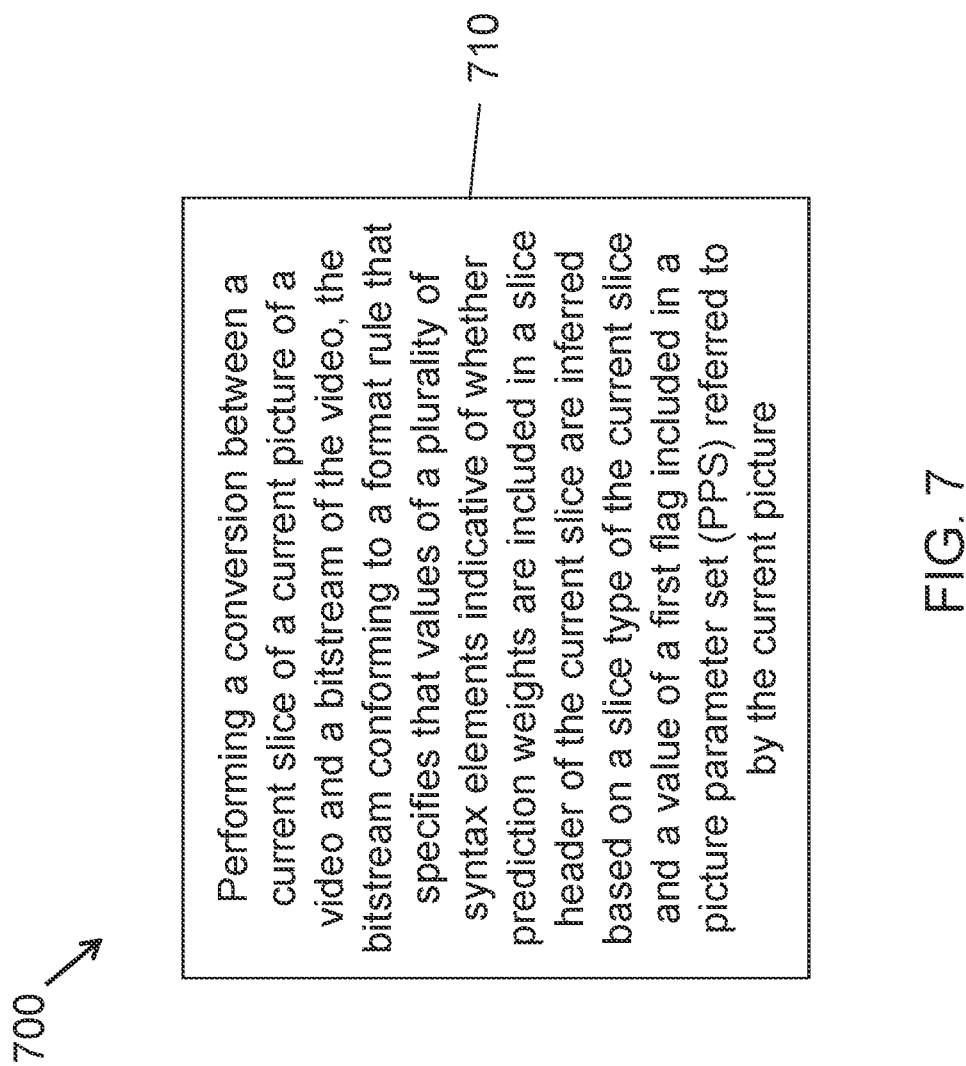

FIG. 7 shows a flowchart for an example method 700 of video processing. The method 700 includes, at operation 710, performing a conversion between a current slice of a current picture of a video and a bitstream of the video, the bitstream conforming to a format rule that specifies that values of a plurality of syntax elements indicative of whether prediction weights are included in a slice header of the current slice are inferred based on a slice type of the current slice and a value of a first flag included in a PPS referred to by the current picture.

Figure 8:
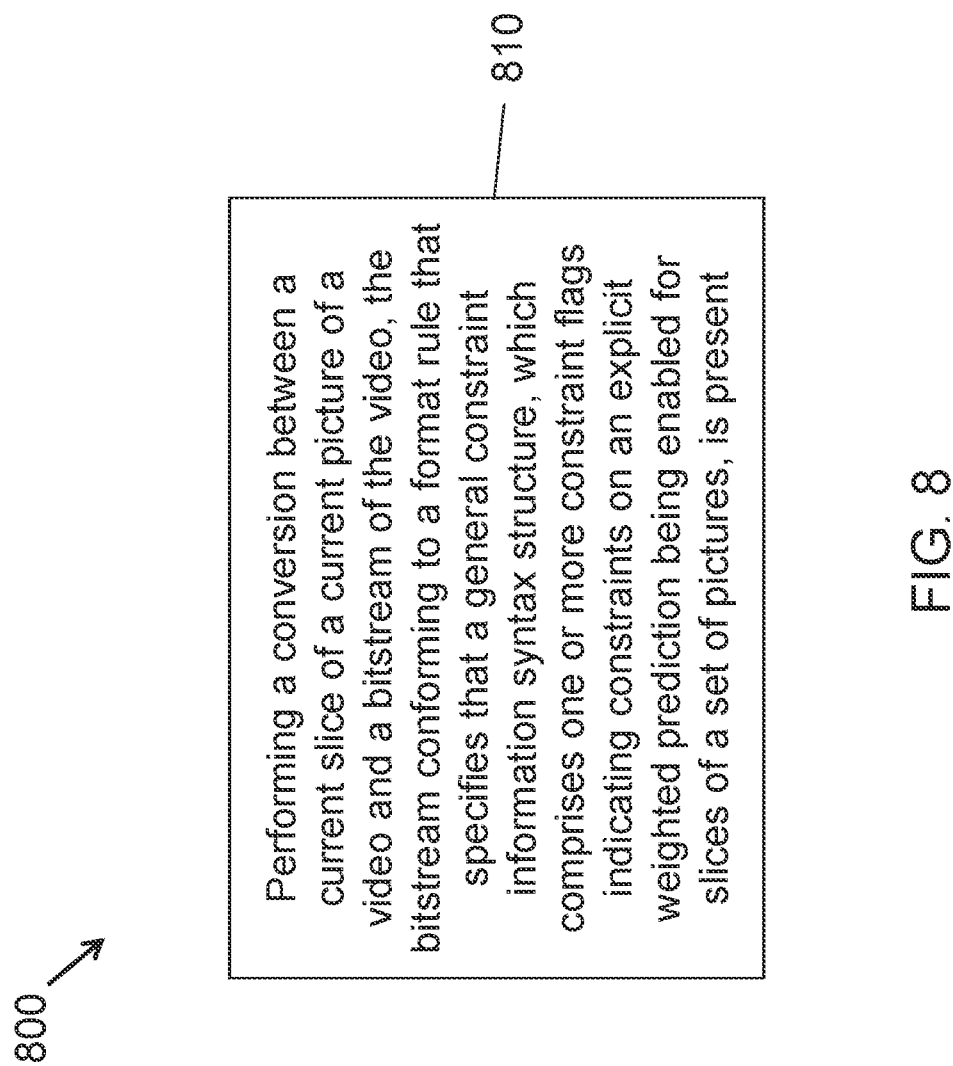

FIG. 8 shows a flowchart for an example method 800 of video processing. The method 800 includes, at operation 810, performing a conversion between a current slice of a current picture of a video and a bitstream of the video, the bitstream conforming to a format rule that specifies that a general constraint information syntax structure, which comprises one or more constraint flags indicating constraints on an explicit weighted prediction being enabled for slices of a set of pictures, is present.

Figure 9:
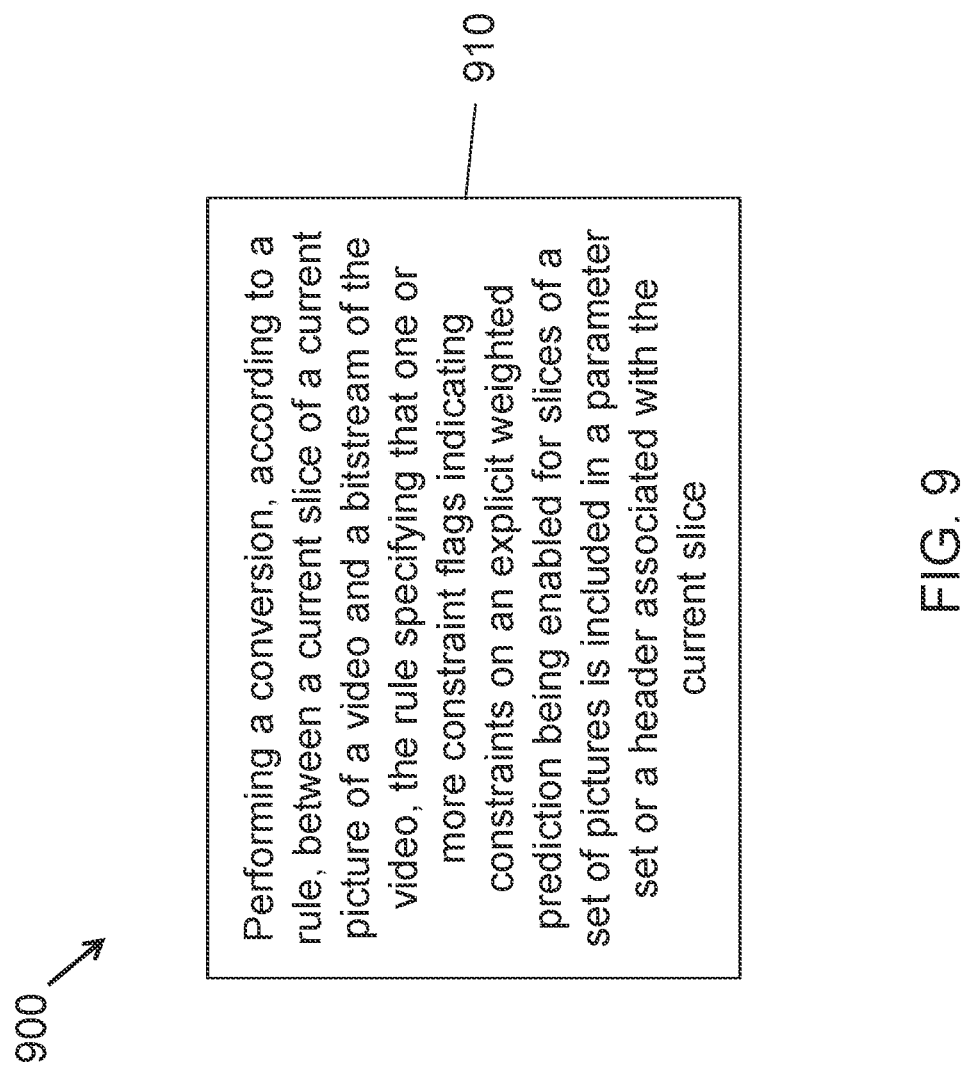

FIG. 9 shows a flowchart for an example method 900 of video processing. The method 900 includes, at operation 910, performing a conversion, according to a rule, between a current slice of a current picture of a video and a bitstream of the video, the rule specifying that one or more constraint flags indicating constraints on an explicit weighted prediction being enabled for slices of a set of pictures is included in a parameter set or a header associated with the current slice.

Figure 10:
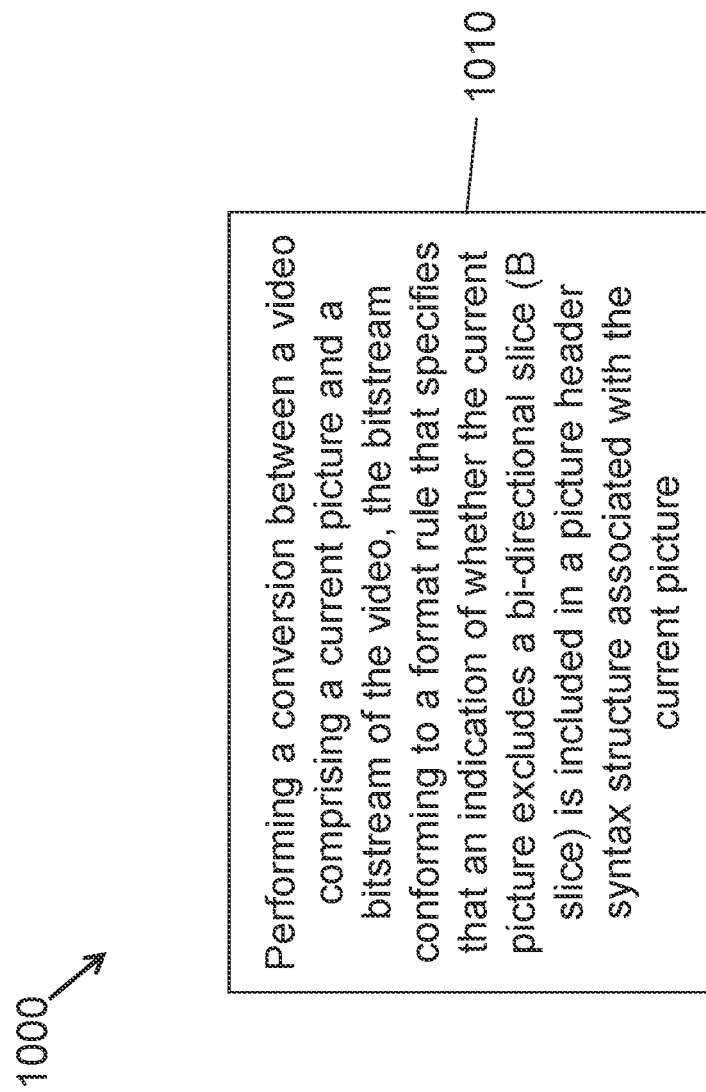

FIG. 10 shows a flowchart for an example method 1000 of video processing. The method 1000 includes, at operation 1010, performing a conversion between a video comprising a current picture and a bitstream of the video, the bitstream conforming to a format rule that specifies that an indication of whether the current picture excludes a bi-directional slice (B slice) is included in a picture header syntax structure associated with the current picture.

A listing of solutions preferred by some embodiments is provided next.

A1. A method of video processing, comprising performing a conversion, according to a rule, between a current slice of a current picture of a video and a bitstream of the video, wherein the rule specifies that a value of a first syntax element of a picture parameter set (PPS) and a value of a second syntax element of the PPS control whether a third syntax element is included in the bitstream, and wherein the first syntax element indicates whether a weighted prediction is enabled for bi-directional slices (B slices) of coded pictures in the bitstream referring to the PPS, the second syntax element indicates whether information related to the weighted prediction is present in picture headers or slice headers of coded pictures referring to the PPS, and the third syntax element indicates a number of weights associated with a reference picture list 1 of the current slice.

A2. The method of solution A1, wherein the first syntax element is pps_weighted_bipred_flag, the second syntax element is wp_info_in_ph_flag, and the third syntax element is num_l1_weights.

A3. The method of solution A1 or A2, wherein the first syntax element equaling zero indicates that the weighted prediction is disabled for B slices of the coded pictures referring to the PPS.

A4. The method of solution A1 or A2, wherein the first syntax element equaling one indicates that the weighted prediction is enabled for B slices of the coded pictures referring to the PPS.

A5. The method of solution A1 or A2, wherein the first syntax element is equal to zero when a fourth syntax element, which is included in a sequence parameter set (SPS), is equal to zero.

A6. The method of solution A5, wherein the fourth syntax element is sps_weighted_bipred_flag.

A7. The method of solution A1 or A2, wherein the first syntax element equaling zero indicates that the number of weights associated with the reference picture list 1 are not included in the slice header of the current slice.

A8. The method of solution A1 or A2, wherein the first syntax element equaling one and the second syntax element equaling one indicates that the number of weights associated with the reference picture list 1 are included in the slice header of the current slice.

A9. The method of any of solutions A1 to A8, wherein the conversion comprises decoding the video from the bitstream.

A10. The method of any of solutions A1 to A8, wherein the conversion comprises encoding the video into the bitstream.

A11. A method of storing a bitstream representing a video to a computer-readable recording medium, comprising generating the bitstream from the video according to a method described in any one or more of solutions A1 to A8; and storing the bitstream in the computer-readable recording medium.

A12. A video processing apparatus comprising a processor configured to implement a method recited in any one or more of solutions A1 to A11.

A13. A computer-readable medium having instructions stored thereon, the instructions, when executed, causing a processor to implement a method recited in one or more of solutions A1 to A11.

A14. A computer readable medium that stores the bitstream generated according to any one or more of solutions A1 to A11.

A15. A video processing apparatus for storing a bitstream, wherein the video processing apparatus is configured to implement a method recited in any one or more of solutions A1 to A11.

Another listing of solutions preferred by some embodiments is provided next.

B1. A method of video processing, comprising performing a conversion between a current slice of a current picture of a video and a bitstream of the video, wherein the bitstream conforms to a format rule, and wherein the format rule specifies that values of a plurality of syntax elements indicative of whether prediction weights are included in a slice header of the current slice are inferred based on a slice type of the current slice and a value of a first flag included in a picture parameter set (PPS) referred to by the current picture.

B2. The method of solution B1, wherein the plurality of syntax elements comprises a first syntax element indicating a number of luma weights associated with a reference picture list 0 of the current slice, a second syntax element indicating a number of chroma weights associated with a reference picture list 0 of the current slice, a third syntax element indicating a number of luma weights associated with a reference picture list 1 of the current slice, and a fourth syntax element indicating a number of luma weights associated with a reference picture list 1 of the current slice.

B3. The method of solution B2, wherein the first syntax element is luma_weight_l0_flag[i], the second syntax element is chroma_weight_l0_flag[i], the third syntax element is luma_weight_l1_flag[i], and the fourth syntax element is chroma_weight_l0_flag[i], and wherein i is a non-negative integer.

B4. The method of solution B2 or B3, wherein the first flag indicates whether weighted prediction is enabled for pictures referring to the PPS, and wherein the first syntax element and the second syntax element are inferred to be zero due to the first flag equaling zero and the slice type being a uni-directional predictive slice (P slice).

B5. The method of solution B4, wherein the first flag is pps_weighted_pred_flag.

B6. The method of solution B2 or B3, wherein the first flag indicates whether weighted bi-prediction is enabled for pictures referring to the PPS, and wherein the first syntax element and the second syntax element are inferred to be zero due to the first flag equaling zero and the slice type being a bi-directional slice (B slice).

B7. The method of solution B2 or B3, wherein the first flag indicates whether weighted bi-prediction is enabled for pictures referring to the PPS, and wherein the third syntax element and the second syntax element are inferred to be zero due to the first flag equaling zero and the slice type being a bi-directional slice (B slice).

B8. The method of solution B6 or B7, wherein the first flag is pps_weighted_bipred_flag.

B9. The method of any of solutions B6 to B8, wherein the current picture refers to the PPS with the first flag equaling zero due to the current picture excluding B slices.

B10. The method of any of solutions B6 to B8, wherein the current picture refers to the PPS with a second flag equaling zero due to the current picture excluding B slices.

B11. The method of any of solutions B6 to B8, wherein a value of a syntax element indicating a number of weights associated with a reference picture list 1 of the current slice is zero due to a second flag equaling zero and the current picture excluding B slices.

B12. The method of solution B10 or B11, wherein the second flag indicates whether information related to weighted prediction is present in picture headers or slice headers of pictures referring to the PPS.

B13. The method of any of solutions B10 to B12, wherein the second flag is wp_info_in_ph_flag.

B14. The method of any of solutions B1 to B13, wherein the conversion comprises decoding the video from the bitstream.

B15. The method of any of solutions B1 to B13, wherein the conversion comprises encoding the video into the bitstream.

B16. A method of storing a bitstream representing a video to a computer-readable recording medium, comprising generating the bitstream from the video according to a method described in any one or more of solutions B1 to B13; and storing the bitstream in the computer-readable recording medium.

B17. A video processing apparatus comprising a processor configured to implement a method recited in any one or more of solutions B1 to B16.

B18. A computer-readable medium having instructions stored thereon, the instructions, when executed, causing a processor to implement a method recited in one or more of solutions B1 to B16.

B19. A computer readable medium that stores the bitstream generated according to any one or more of solutions B1 to B16.

B20. A video processing apparatus for storing a bitstream, wherein the video processing apparatus is configured to implement a method recited in any one or more of solutions B1 to B16.

Yet another listing of solutions preferred by some embodiments is provided next.

C1. A method of video processing, comprising performing a conversion between a current slice of a current picture of a video and a bitstream of the video, wherein the bitstream conforms to a format rule, and wherein the format rule specifies that a general constraint information syntax structure, which comprises one or more constraint flags indicating constraints on an explicit weighted prediction being enabled for slices of a set of pictures, is present.

C2. The method of solution C1, wherein the one or more constraint flags is included in the bitstream.

C3. The method of solution C1, wherein the one or more constraint flags is included in a parameter set associated with the current slice.

C4. The method of solution C1, wherein the one or more constraint flags is included in a decoder capability information network abstraction layer (NAL) unit.

C5. The method of solution C1, wherein the one or more constraint flags comprises a first constraint flag indicating whether the explicit weighted prediction is applied to one or both of uni-directional predictive slices (P slices) and bi-predictive slices (B slices) of the set of pictures, and wherein a value of the first constraint flag conforms with a value of a second flag included in a sequence parameter set (SPS) associated with the current slice.

C6. The method of solution C5, wherein the first constraint flag is gci_no_explicit_weighted_prediction_constraint_flag.

C7. The method of solution C5, wherein the first constraint flag equals zero due to the second flag equaling one.

C8. The method of solution C7, wherein the second flag is sps_weighted_pred_flag or sps_weighted_bipred_flag.

C9. A method of video processing, comprising performing a conversion, according to a rule, between a current slice of a current picture of a video and a bitstream of the video, wherein the rule specifies that one or more constraint flags indicating constraints on an explicit weighted prediction being enabled for slices of a set of pictures is included in a parameter set or a header associated with the current slice.

C10. The method of solution C9, wherein the one or more constraint flags consists of a first flag indicating whether an indication of an explicit weighted prediction for uni-directional predictive slices (P slices) or a bi-predictive slices (B slices) is included in a sequence parameter set (SPS) associated with the current slice.

C11. The method of solution C10, wherein the first flag is sps_weighted_pred_flag or sps_weighted bipred_flag.

C12. The method of solution C9, wherein the one or more constraint flags consists of a first flag indicating whether an indication of an explicit weighted prediction for uni-directional predictive slices (P slices) or a bi-predictive slices (B slices) is included in a picture parameter set (PPS) associated with the current slice.

C13. The method of solution C12, wherein the first flag is pps_weighted_pred_flag or pps_weighted_bipred_flag.

C14. The method of solution C9, wherein the one or more constraint flags comprises a first constraint flag indicating whether the explicit weighted prediction is applied to one or both of uni-directional predictive slices (P slices) and a bi-predictive slices (B slices), and wherein a value of the first constraint flag conforms with a value of a second constraint flag included in a picture parameter set (PPS) associated with the current slice.

C15. The method of solution C9, wherein the one or more constraint flags consists of a first flag indicating whether an indication of an explicit weighted prediction for uni-directional predictive slices (P slices) or a bi-predictive slices (B slices) is included in a picture header or a slice header associated with the current slice.

C16. The method of solution C15, wherein the indication is included in the picture header or the slice header due to information related to a reference picture list being included in a picture header syntax structure or a slice header syntax structure, respectively.

C17. The method of solution C15, wherein including the indication is based on a slice type of a slice associated with the current video block.

C18. The method of solution C15, wherein including the indication is based on a current picture comprising inter slices, P slices, or B slices.

C19. A method of video processing, comprising performing a conversion between a video comprising a current picture and a bitstream of the video, wherein the bitstream conforms to a format rule, and wherein the format rule specifies that an indication of whether the current picture excludes a bi-directional slice (B slice) is included in a picture header syntax structure associated with the current picture.

C20. The method of solution C19, wherein the indication equaling one specifies that the current picture includes one or more B slices.

C21. The method of solution C19, wherein the indication equaling zero specifies that the current picture excludes a B slice.

C22. The method of solutions C20 or C21, wherein the indication is ph_b_slices_allowed_flag.

C23. The method of solution C19, wherein the indication equaling zero specifies that syntax elements in a syntax structure related to a reference picture list 1 are excluded from the bitstream.

C24. The method of solution C23, wherein the indication is ph_b_slices_allowed_flag, and wherein the syntax structure is ref_pic_lists( ) or ref_pic_list_struct( ).

C25. The method of solution C19, wherein the indication equaling zero specifies that a syntax element, related to parsing a syntax structure for a motion vector difference coding tool, is excluded from the picture header syntax structure.

C26. The method of solution C19, wherein the indication equaling zero specifies that a value of a syntax element, related to parsing a syntax structure for a motion vector difference coding tool, is inferred to be equal to one.

C27. The method of solution C25 or C26, wherein the indication is ph_b_slices_allowed_flag, and wherein the syntax element is mvd_l1_zero_flag.

C28. The method of solution C19, wherein the indication equaling zero specifies that a syntax element, related to a weighted prediction of a current video block in the current picture, is excluded from the bitstream.

C29. The method of solution C28, wherein the indication is ph_b_slices_allowed_flag, and wherein the syntax element is num_l1_weights.

C30. The method of solution C19, wherein the indication equaling zero specifies that a syntax element, related to a maximum reference index for a reference picture list associated with the current picture, is excluded from a slice header syntax structure.

C31. The method of solution C30, wherein the indication is ph_b_slices_allowed_flag, and wherein the syntax element is num_ref_idx_active_minus1.

C32. The method of solution C19, wherein the indication equaling zero specifies that a syntax element, related to a collocated slice used for temporal motion vector prediction of a current video block in the current picture is derived from a reference picture list 0 associated with the current picture, is excluded from a slice header syntax structure.

C33. The method of solution C32, wherein indication is ph_b_slices_allowed_flag, and wherein the syntax element is slice_collocated_from_l0_flag.

C34. The method of any of solutions C1 to C33, wherein the conversion comprises decoding the video from the bitstream.

C35. The method of any of solutions C1 to C33, wherein the conversion comprises encoding the video into the bitstream.

C36. A method of storing a bitstream representing a video to a computer-readable recording medium, comprising generating the bitstream from the video according to a method described in any one or more of solutions C1 to C33; and storing the bitstream in the computer-readable recording medium.

C37. A video processing apparatus comprising a processor configured to implement a method recited in any one or more of solutions C1 to C36.

C38. A computer-readable medium having instructions stored thereon, the instructions, when executed, causing a processor to implement a method recited in one or more of solutions C1 to C36.

C39. A computer readable medium that stores the bitstream generated according to any one or more of solutions C1 to C36.

C40. A video processing apparatus for storing a bitstream, wherein the video processing apparatus is configured to implement a method recited in any one or more of solutions C1 to C36.

Yet another listing of solutions preferred by some embodiments is provided next.

P1. A video processing method, comprising performing a conversion between a video region of a video and a coded representation of the video, wherein the coded representation conforms to a format rule, wherein the format rule specifies that a value of a first field indicating enablement of weighted prediction for the video region controls whether a second field indicating a number of weights associated with a reference picture list associated with the conversion of the video region.

P2. The method of solution P1, wherein the format rule specifies that the second field is excluded from the coded representation in case that the first field indicates that the weighted prediction is disabled.

P3. The method of solution P1 or P2, wherein the second field indicating the number of weights associated with the reference picture list indicates luma weights.

P4. The method of any of solutions P1 to P3, wherein the second field indicating the number of weights associated with the reference picture list indicates chroma weights.

P5. The method of any of solutions P1 to P4, wherein the reference picture list corresponds to reference picture list 1.

P6. The method of any of solutions P1 to P5, wherein the video region corresponds to a bidirectional slice (B slice).

P7. The method of any of solutions P1 to P5, wherein the video region corresponds to a uni-directional predictive slice (P slice).

P8. A video processing method, comprising performing a conversion between a video comprising one or more video pictures and a coded representation of the video, wherein the coded representation conforms to a format rule, wherein the format rule specifies that syntax element in a picture header of a video picture indicates whether the video picture includes a slice that is a bi-directionally predicted slice or bi-predictive (B slice).

P9. The method of solution P8, wherein the syntax element is a single-bit flag.

P10. The method of solution P8 or P9, wherein the format rule further to exclude syntax elements related to a second reference picture list (reference picture list 1) in case that the first field indicates that the video picture includes zero B slices.

P11. The method of solution P10, wherein the syntax elements related to the second reference picture list are from the picture header.

P12. The method of solution P10, wherein the syntax elements include syntax elements related to weight parameters for using the second reference picture list.

P13. The method of any of above claims, wherein the video region comprises a video coding unit.

P14. The method of any of above claims, wherein the video region comprises a video picture.

P15. The method of any of solutions P1 to P14, wherein the conversion comprises encoding the video into the coded representation.

P16. The method of any of solutions P1 to P14, wherein the conversion comprises decoding the coded representation to generate pixel values of the video.

P17. A video decoding apparatus comprising a processor configured to implement a method recited in one or more of solutions P1 to P16.

P18. A video encoding apparatus comprising a processor configured to implement a method recited in one or more of solutions P1 to P16.

P19. A computer program product having computer code stored thereon, the code, when executed by a processor, causes the processor to implement a method recited in any of solutions P1 to P16.

P20. A method, apparatus or system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation (or simply, the bitstream) of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks: magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
    performing a conversion between a current slice of a current picture of a video and a bitstream of the video,
    wherein the bitstream conforms to a format rule,
    wherein the format rule specifies that a general constraint information syntax structure is present and is at a higher level than a sequence parameter set (SPS),
    wherein a first constraint flag gci_no_explicit_weighted_prediction_constraint_flag is included in the general constraint information syntax structure and indicates constraints on an explicit weighted prediction being enabled for both of uni-directional predictive slices (P slices) and bi-predictive slices (B slices) of a set of pictures, and
    wherein in response to a value of the first constraint flag indicating that the explicit weighted prediction is not applied to both of the P slices and the B slices:
        a value of a second flag included in the SPS indicates that the explicit weighted prediction is not applied to the P slices referring to the SPS, and
        a value of a third flag included in the SPS indicates that the explicit weighted prediction is not applied to the B slices referring to the SPS.

2. The method of claim 1, wherein the first constraint flag is included in the bitstream.

3. The method of claim 1, wherein the first constraint flag is included in a parameter set associated with the current slice.

4. The method of claim 1, wherein the first constraint flag is included in a decoder capability information network abstraction layer (NAL) unit.

5. The method of claim 1, wherein the second flag is sps_weighted_pred_flag, and wherein the third flag is sps_weighted_bipred_flag.

6. The method of claim 1, wherein the conversion comprises decoding the video from the bitstream.

7. The method of claim 1, wherein the conversion comprises encoding the video into the bitstream.

8. An apparatus for processing video data comprising a processor and a non-transitory memory with instructions thereon, wherein the instructions upon execution by the processor, cause the processor to:
    perform a conversion between a current slice of a current picture of a video and a bitstream of the video,
    wherein the bitstream conforms to a format rule,
    wherein the format rule specifies that a general constraint information syntax structure is present and is at a higher level than a sequence parameter set (SPS),
    wherein a first constraint flag gci_no_explicit_weighted_prediction_constraint_flag is included in the general constraint information syntax structure and indicates constraints on an explicit weighted prediction being enabled for both of uni-directional predictive slices (P slices) and bi-predictive slices (B slices) of a set of pictures, and
    wherein in response to a value of the first constraint flag indicating that the explicit weighted prediction is not applied to both of the P slices and the B slices:
        a value of a second flag included in the SPS indicates that the explicit weighted prediction is not applied to the P slices referring to the SPS, and
        a value of a third flag included in the SPS indicates that the explicit weighted prediction is not applied to the B slices referring to the SPS.

9. The apparatus of claim 8, wherein the second flag is sps_weighted_pred_flag, and wherein the third flag is sps_weighted_bipred_flag.

10. The apparatus of claim 8, wherein the first constraint flag is included in the bitstream.

11. The apparatus of claim 8, wherein the first constraint flag is included in a parameter set associated with the current slice.

12. The apparatus of claim 8, wherein the first constraint flag is included in a decoder capability information network abstraction layer (NAL) unit.

13. A non-transitory computer-readable storage medium storing instructions that cause a processor to:
    perform a conversion between a current slice of a current picture of a video and a bitstream of the video,
    wherein the bitstream conforms to a format rule,
    wherein the format rule specifies that a general constraint information syntax structure is present and is at a higher level than a sequence parameter set (SPS),
    wherein a first constraint flag gci_no_explicit_weighted_prediction_constraint_flag is included in the general constraint information syntax structure and indicates constraints on an explicit weighted prediction being enabled for both of uni-directional predictive slices (P slices) and bi-predictive slices (B slices) of a set of pictures, and
    wherein in response to a value of the first constraint flag indicating that the explicit weighted prediction is not applied to both of the P slices and the B slices:
        a value of a second flag included in the SPS indicates that the explicit weighted prediction is not applied to the P slices referring to the SPS, and
        a value of a third flag included in the SPS indicates that the explicit weighted prediction is not applied to the B slices referring to the SPS.

14. The non-transitory computer-readable storage medium of claim 13, wherein the second flag is sps_weighted_pred_flag, and wherein the third flag is sps_weighted_bipred_flag.

15. The non-transitory computer-readable storage medium of claim 13, wherein the first constraint flag is included in the bitstream.

16. The non-transitory computer-readable storage medium of claim 13, wherein the first constraint flag is included in a parameter set associated with the current slice.

17. The non-transitory computer-readable storage medium of claim 13, wherein the first constraint flag is included in a decoder capability information network abstraction layer (NAL) unit.

18. A non-transitory computer-readable recording medium storing a bitstream of a video which is generated by a method performed by a video processing apparatus, wherein the method comprises:
    generating, according to a format rule, the bitstream of the video comprising a current picture, wherein the current picture comprises a current slice,
    wherein the bitstream conforms to the format rule,
    wherein the format rule specifies that a general constraint information syntax structure is present and is at a higher level than a sequence parameter set (SPS),
    wherein a first constraint flag_gci_no_explicit_weighted_prediction_constraint_flag is included in the general constraint information syntax structure and indicates constraints on an explicit weighted prediction being enabled for both of uni-directional predictive slices (P slices) and bi-predictive slices (B slices) of a set of pictures, and
    wherein in response to a value of the first constraint flag indicating that the explicit weighted prediction is not applied to both of the P slices and the B slices:
        a value of a second flag included in the SPS indicates that the explicit weighted prediction is not applied to the P slices referring to the SPS, and
        a value of a third flag included in the SPS indicates that the explicit weighted prediction is not applied to the B slices referring to the SPS.

19. The non-transitory computer-readable recording medium of claim 18,
    wherein the second flag is sps_weighted_pred_flag, and
    wherein the third flag is sps_weighted_bipred_flag.

* * * * *